(12) United States Patent
Brantley et al.

(10) Patent No.: US 6,390,915 B2
(45) Date of Patent: May 21, 2002

(54) COMBINE FOR SEPARATING CROPS

(75) Inventors: Stanley A. Brantley, Ivor, VA (US); Junius Warren White, Hobbsville, NC (US)

(73) Assignee: Amadas Industries, Suffolk, VA (US)

( * ) Notice: Subject to any disclaimer, the term of this patent is extended or adjusted under 35 U.S.C. 154(b) by 0 days.

(21) Appl. No.: 09/253,526

(22) Filed: Feb. 22, 1999

(51) Int. Cl.$^7$ ................................................ A01D 29/00

(52) U.S. Cl. ........................................ 460/131; 56/14.6

(58) Field of Search ........................... 660/131, 80, 85, 660/83, 84, 86, 87, 88, 89, 113, 901, 101, 121, 142

(56) References Cited

U.S. PATENT DOCUMENTS

| | | |
|---|---|---|
| 311,494 A | 2/1885 | Johnson |
| 329,602 A | 11/1885 | Smith |
| 567,372 A | 9/1896 | Beach |
| 808,442 A | 12/1905 | Ferguson et al. |
| 1,158,248 A | 10/1915 | Livermon |
| 1,744,906 A | 1/1930 | Livermon |
| 1,859,759 A | 5/1932 | Walters |
| 2,245,997 A | 6/1941 | Olson ........................ 198/213 |
| 2,272,148 A | 2/1942 | Dray ......................... 209/154 |
| 2,303,222 A | 11/1942 | Murray ........................ 209/71 |
| 2,669,268 A | 2/1954 | Meyer ........................... 146/8 |
| 3,007,475 A | 11/1961 | Long ........................... 130/30 |
| 3,209,758 A | 10/1965 | Nilsson et al. ................ 130/27 |
| 3,381,455 A | 5/1968 | Mitchell ........................ 56/19 |
| 3,404,517 A | 10/1968 | Whitfield et al. ............... 56/19 |
| 3,566,880 A * | 3/1971 | Riffe ........................... 460/99 |
| 3,580,258 A * | 5/1971 | Stroburg ...................... 460/100 |
| 3,603,063 A | 9/1971 | Stroburg ...................... 56/14.6 |
| 3,703,802 A * | 11/1972 | Wrestler et al. .............. 56/13.3 |
| 4,000,747 A | 1/1977 | Rodger ........................ 130/30 |
| 4,066,087 A * | 1/1978 | Rodgers ...................... 460/142 |
| 4,103,691 A | 8/1978 | Shaver ........................ 130/24 |
| 4,136,507 A | 1/1979 | Hobbs ......................... 56/126 |
| 4,140,281 A | 2/1979 | Fulghum, Jr. et al. ......... 241/28 |
| 4,166,505 A | 9/1979 | West ............................. 171/1 |
| 4,172,500 A | 10/1979 | Smith ......................... 171/101 |
| 4,173,155 A * | 11/1979 | Togami et al. ........ 74/230.17 M |
| 4,227,538 A | 10/1980 | Long et al. ................... 130/30 |
| 4,257,216 A | 3/1981 | Eiker, Jr., et al. ............ 56/14.6 |
| 4,416,334 A | 11/1983 | Bouillon ...................... 171/27 |
| 4,441,511 A * | 4/1984 | Schroeder .................... 460/13 |
| 4,454,787 A * | 6/1984 | Love et al. .................. 475/263 |
| 4,455,812 A * | 6/1984 | James ........................ 56/11.5 |

(List continued on next page.)

OTHER PUBLICATIONS

"Field Test of an Exterior Screening Attachment for an Amadas Magnum Fource, 6–Row Peanut Combine", USDA–ARS National Peanut Research Laboratory, Oct. 18, 1996, 12 pages.

Magnum Force Advertisement, Amadas Industries, 1994, 4 pages.

Amadas Combine–Mounted Peanut Cleaner Advertisement, Amadas Industries, 1 page, No date.

Hobbs Engineering Company, Firebird 2000 Peanut Combine Parts Catalog, 54 pages.

Hobbs Engineering Company, Firebird 2000 Peanut Combine Operation and Maintenance Manual, 36 pages.

*Primary Examiner*—H. Shackelford
*Assistant Examiner*—Árpád F Kovács
(74) *Attorney, Agent, or Firm*—Burns, Doane, Swecker & Mathis, LLP

(57) ABSTRACT

A combine having a variable speed drive that rotates at least one of a plurality of thrashing cylinders that thrash crops. Three of the thrashing cylinders have a gradually increasing number of flexible fingers that thrash the crops. The combine also includes a drum separator located downstream of the thrashing cylinders with respect to the direction of crop flow in the combine. The drum separator separates desirable portions of the crops and is part of a tailings return system. The combine also includes disk separators that are configured to minimize damage to desirable portions of the crops.

23 Claims, 17 Drawing Sheets

U.S. PATENT DOCUMENTS

| | | | | |
|---|---|---|---|---|
| 4,470,420 A | * | 9/1984 | Hanaway | 460/13 |
| 4,489,735 A | | 12/1984 | Akesson | 130/30 H |
| 4,597,977 A | * | 7/1986 | Brown | 426/482 |
| 4,607,703 A | | 8/1986 | Wang | 171/1 |
| 4,689,036 A | * | 8/1987 | Love | 474/17 |
| 4,696,151 A | * | 9/1987 | Hobbs | 56/14.6 |
| 5,024,278 A | | 6/1991 | Shuknecht | 171/17 |
| 5,138,826 A | | 8/1992 | Hobbs | 56/14.6 |
| 5,205,114 A | * | 4/1993 | Hobbs | 56/14.6 |
| 5,210,999 A | | 5/1993 | Cosimati | 56/327.1 |
| 5,467,700 A | | 11/1995 | Dowell et al. | 99/570 |
| 5,468,187 A | * | 11/1995 | Edwards, Jr. | 460/126 |
| 5,873,227 A | * | 2/1999 | Arner | 56/14.6 |
| 5,980,382 A | * | 11/1999 | Stroburg | 460/100 |

\* cited by examiner

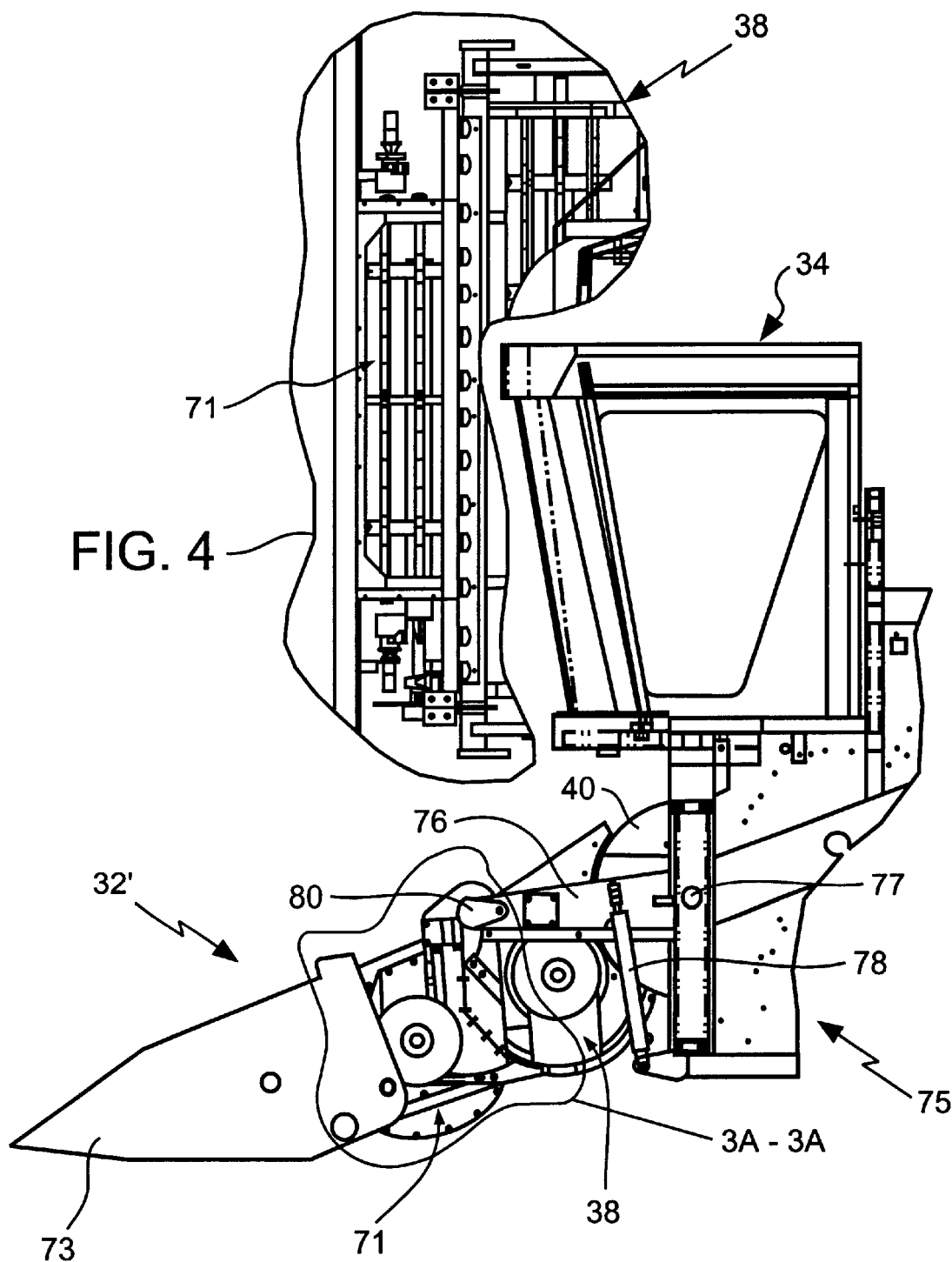

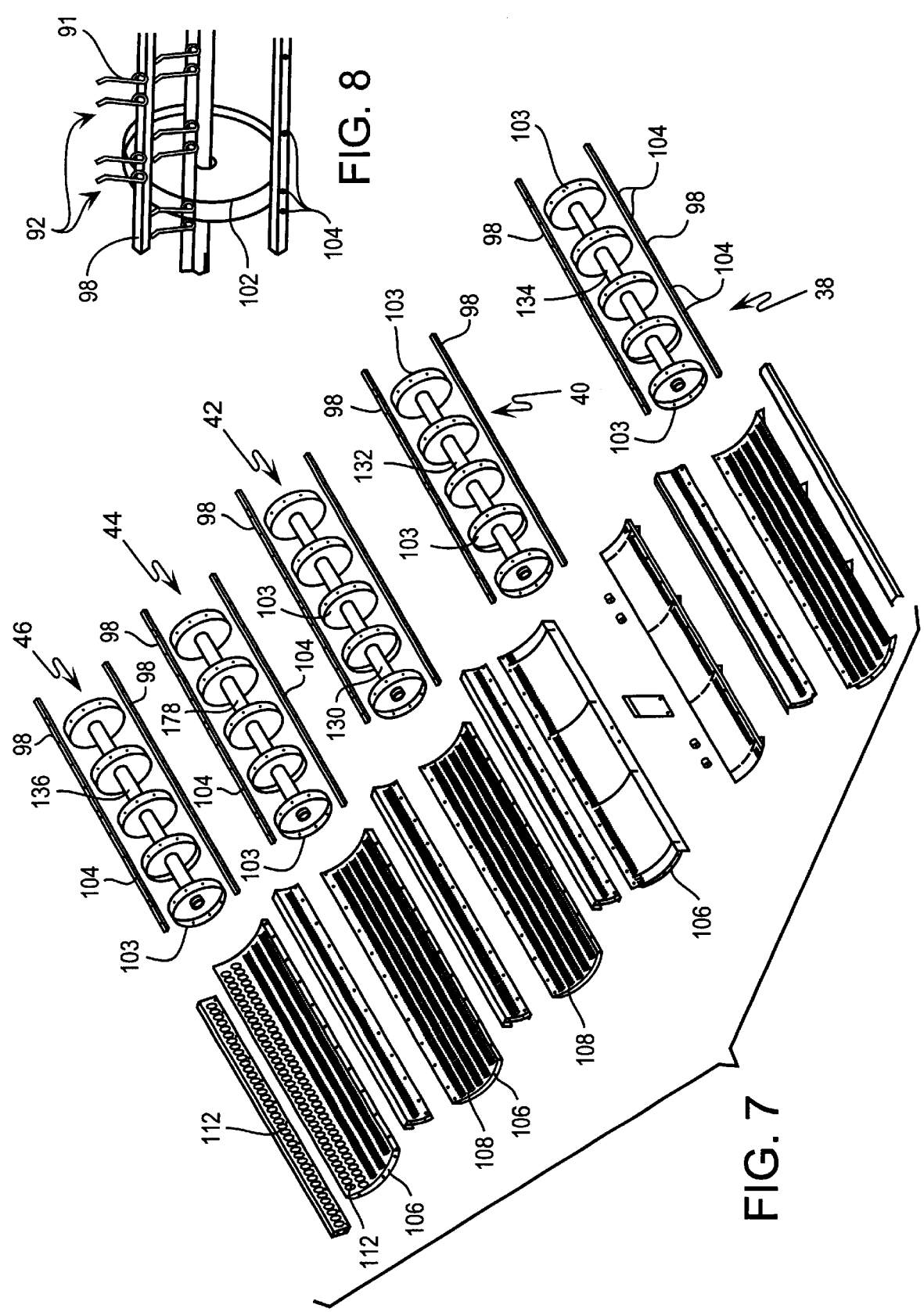

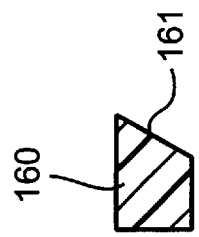
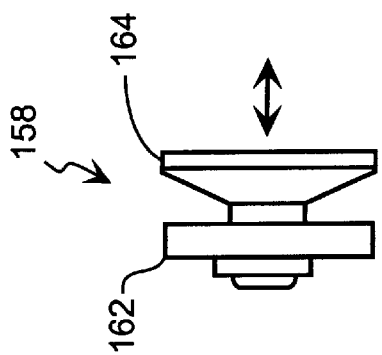
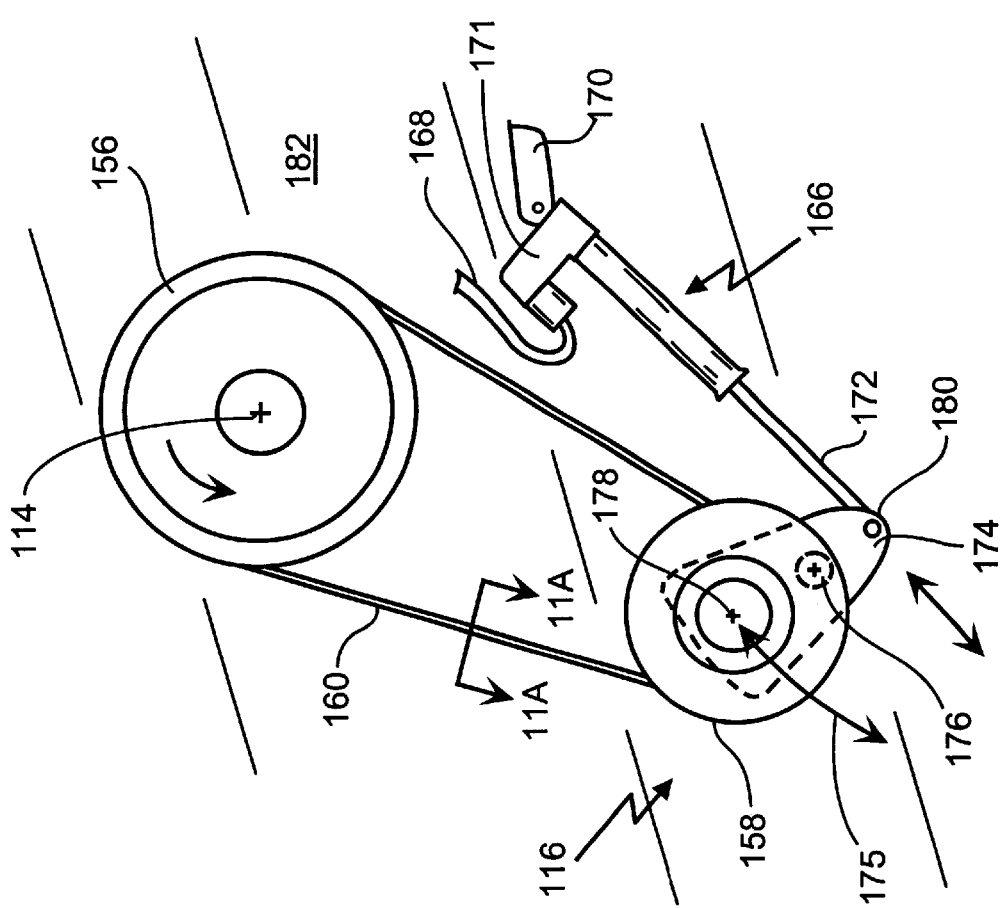

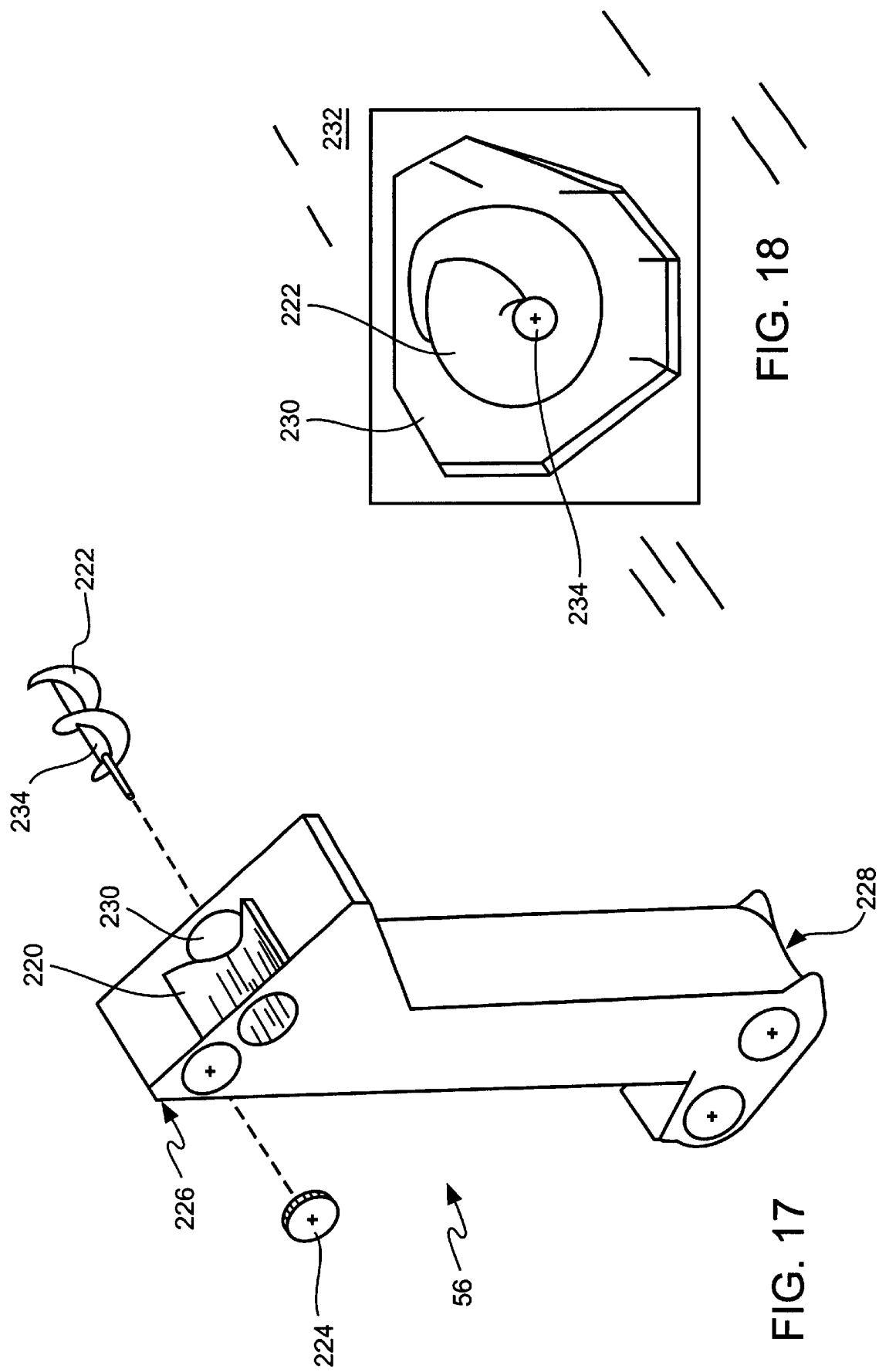

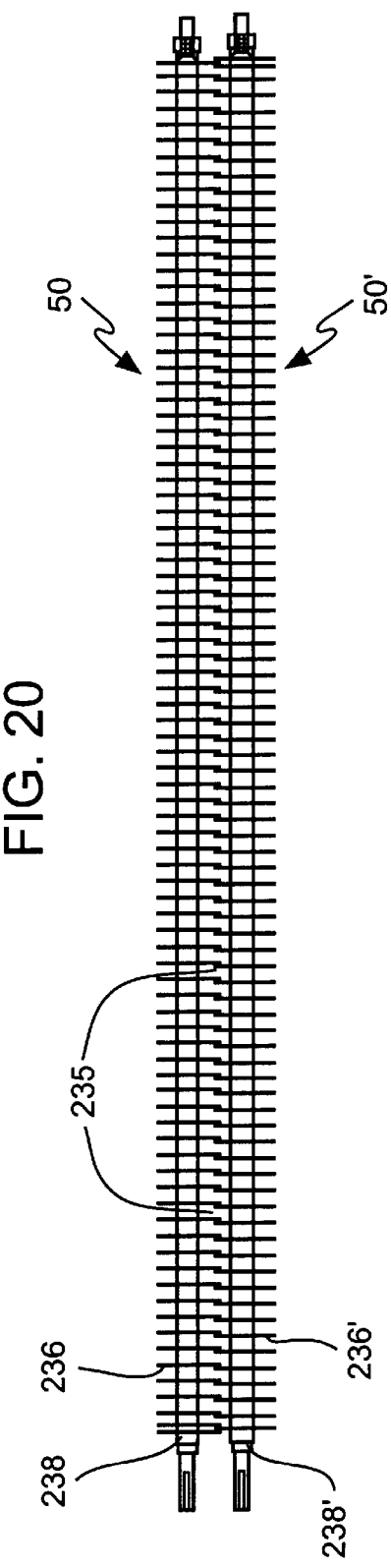
FIG. 20
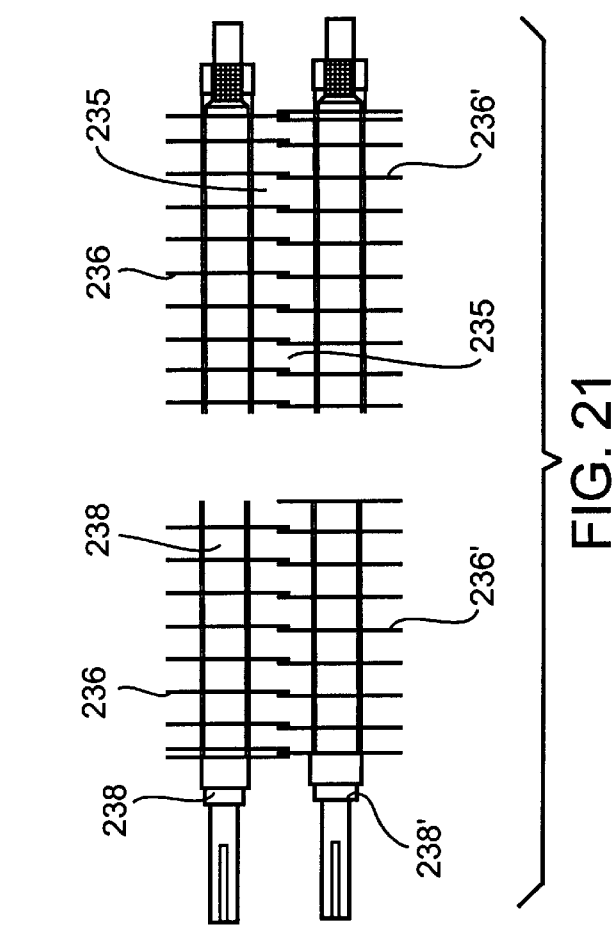
FIG. 24 PRIOR ART
FIG. 21

COMBINE FOR SEPARATING CROPS

BACKGROUND OF THE INVENTION

1. Field of the Invention

The present invention relates to combines for separating crops, and more particularly, to a bean combine for separating beans pods from bean plants and shelling the bean pods.

2. Description of the Related Art

Edible beans grow above ground and come in many different varieties. These beans are essentially seeds in pods. Many of these beans are harvested after their pods have at least partially dried, and are either used for commercial food or seed stock. Examples of such edible beans include dark red kidney beans, light red kidney beans, black beans, pinto beans, cranberry beans, navy beans, and soy beans. These beans are typically harvested by combines on a large scale for commercial use. Generally speaking, conventional combines perform the operations of: (1) removing bean laden plants from the ground; (2) picking the bean pods from the bean vines; (3) separating the picked bean pods from the bean vines and other debris; (4) removing the shell from the bean pods ("shelling" the pods); and (5) delivering the shelled beans to a storage container.

Conventional combines do not have the capacity to harvest large quantities of bean plants without causing damage to a high percentage of the shelled beans. In some instances, conventional bean combines damage as much as 10% of the shelled beans. Damaged beans are acceptable for some specific applications. However, for most edible beans, this damage is particularly problematic because damaged edible beans are less desirable than undamaged beans, especially when the beans are used in commercial food applications, such as bean canneries.

Damage typically occurs to the beans during a conventional combining process when the combine attempts to shell the beans from their pods. During this process, it is difficult to remove the beans from the pods without damaging the beans. In an attempt to harvest beans without damaging the beans, various different combines have been used with little success.

A conventional combine that is used to harvest beans typically includes a pickup and feeder section, a picking section, and a separating section. The pickup and feeder section lifts the plants from the ground via a header and transfers them to a thrashing cylinder in the picking section, which rotates at high speeds. Generally speaking, the thrashing cylinder subjects the bean laden vines to a "thrashing" motion, i.e., the bean laden vines are whipped by the thrashing cylinder. This bends and tears the bean vines into smaller pieces, and separates the unshelled pods from the vines. The trashing motion also separates the beans from the pods so as to obtain shelled beans. After the beans have been shelled, the beans and other debris are transferred to a separator where the beans are separated from the other portions of the crop.

One problem associated with using a thrashing cylinder to separate beans from bean laden vines, is that the thrashing motion tends to damage the beans that have been shelled, i.e, the skin of the bean is broken or cracked. When harvesting beans, the ultimate objective is to both remove the beans from the bean plant and to shell the beans without damaging the beans. This is in contrast to other types of crops, like peanuts, where it is desirable to leave the shell intact.

Convention wisdom teaches that severe thrashing is required to shell the beans from their pods. Otherwise, a large percentage of the beans remain unshelled. Thus, conventional bean combines typically run the rotational speed of one thrashing cylinder at speeds greater than that of, for example, a peanut combine. However, more thrashing necessarily causes more damage to the beans—a problem that has plagued conventional bean combines. Furthermore, weather conditions and geographic climates vary and influence how easily the beans are shelled and damaged. Conventional combines have no means for adjusting their harvesting methods to accommodate for these varying conditions, and thus have erratic results.

From the foregoing, it will be appreciated that it has been particularly problematic to both separate bean pods from bean laden vines and to shell the beans without causing damage to the beans. The above-described constraints and problems associated with harvesting beans has created a need for a solution. The above-described problems are also associated with combines that harvest other crops besides beans.

SUMMARY OF THE INVENTION

Generally speaking, the present invention provides a combine having various features that minimize damage to desirable portions of crops, especially edible beans.

The present invention provides a combine for separating crops. The combine includes a separator having an outer wall defining an interior space. The outer wall has a plurality of perforations therethrough. The separator has an inlet to the interior space and has an outlet from the interior space. The separator is also rotatable. The perforations of the separator separate shelled crops from unshelled crops. A device rotates the separator. At least one thrashing cylinder has a plurality of fingers that thrashes the crops. A conveyor conveys crops to the inlet of the separator from a location downstream of the thrashing cylinder with respect to a direction of crop travel in the combine. A channel communicates the outlet of the separator with the thrashing cylinder. The channel conveys unshelled crops from the interior of the separator to the thrashing cylinder.

According to another aspect of the present invention a combine for separating crops includes a drum-shaped separator that has an interior and a cylindrical exterior surface. The exterior surface has a plurality of perforations therethrough. The separator is mounted for rotation. The perforations separate shelled crops from unshelled crops. A bin has an interior that holds crops that have been shelled by the separator. The separator is located above the interior of the bin such that shelled crops fall through the perforations into the bin.

A further aspect of the present invention pertains to a method of separating crops with a combine. A portion of pods of crops are shelled to define shelled seeds, unshelled seeds, and other portions of the crops by thrashing the crops with a plurality of moving fingers in the combine. The shelled seeds and the unshelled seeds are at least partially separated from the other portions of the crops to define a plurality of separated items having the at least partially separated shelled seeds and unshelled seeds. The shelled seeds are substantially separated from the unshelled seeds in the plurality of separated items by screening the plurality of separated items with a screen of the combine.

Yet a further aspect of the present invention pertains to a combine for separating crops. The combine includes a first thrashing cylinder that has a plurality of radially outwardly extending fingers that thrash crops. The first thrashing cylinder is mounted for rotation. A second thrashing cylinder has a plurality of radially outwardly extending fingers that thrash crops. The second thrashing cylinder is mounted for rotation. A variable speed drive varies a rotation speed of the second thrashing cylinder relative to a rotation speed of the first thrashing cylinder while the first thrashing cylinder is rotating.

A further aspect of the present invention pertains to a method of separating crops with a combine. The method includes the step of rotating a first thrashing cylinder having a plurality of radially outwardly extending fingers at a first speed to separate the crops, and rotating a second thrashing cylinder having a plurality of radially outwardly extending fingers at either a second or third speed to separate the crops, where the second and third speeds are different than the first speed. The method further includes the step of varying the speed of the second thrashing cylinder from the second speed to the third speed while the first thrashing cylinder is rotating at the first speed.

The present invention also pertains to a combine for separating crops. The combine has a first thrashing cylinder that has a first number of radially outwardly extending fingers. The first thrashing cylinder is rotatably mounted. A second thrashing cylinder has a second number of radially outwardly extending fingers. The second number is approximately double the first number. The second trashing cylinder is rotatably mounted. A third thrashing cylinder has a third number of radially outwardly extending fingers. The third number is approximately quadruple the first number, and the third thrashing cylinder is rotatably mounted.

Another aspect of the present invention pertains to a disk separator assembly for a crop separating combine. The disk separator assembly has a first rotatable shaft having a plurality of disks. Each of the disks extends radially away from the shaft and are each spaced from each other along a length of the shaft. Each of the disks has a substantially circular circumference defined by an outer edge of the disk. The outer edge has a plurality of rounded projections. A second rotatable shaft has a plurality of the disks. Each of the disks of the second shaft extends radially away from the second shaft and are each spaced from each other along a length of the second shaft. The first and second shafts are parallel with each other and spaced from each other such that the disks of the first and second shafts interdigitate.

A further aspect of the present invention pertains to a disk separator assembly for separating desirable portions of a crop in a combine. The disk separator assembly includes a first rotatable shaft having a plurality of circular disks. Each of the disks extends radially outwardly away from the first shaft and each of the disks are spaced from each other along a length of the first shaft. A second rotatable shaft has a plurality of circular disks. Each of the disks extends radially outwardly away from the second shaft and are each spaced from each other along a length of the second shaft. The space between the disks of the second shaft each have a midpoint as measured along the length of the second shaft. The first and second shafts are parallel with each other and are spaced from each other such that the disks of the first and second shafts interdigitate. The disks of the first shaft do not bisect the midpoint of the space between adjacent disks of the second shaft.

Other objects, advantages and features associated with the present invention will become readily apparent to those skilled in the art from the following detailed description. As will be realized, the invention is capable of other and different embodiments, and its several details are capable of modification in various obvious aspects, all without departing from the invention. Accordingly, the drawings and the description are to be regarded as illustrative in nature, and not limitative.

BRIEF DESCRIPTION OF THE DRAWINGS

FIG. 3 is a side view of the header and feeder house that may be used with the combine.

FIG. 4 is a partial top view of the header illustrated in FIG. 3.

FIG. 7 is a partial and exploded perspective view of one embodiment of thrashing cylinders assemblies of the combine.

FIG. 8 is a partial perspective view of a portion of a thrashing cylinder.

FIG. 11 is a partial side view of one embodiment of an adjustable drive device that is used to vary the angular velocity of a thrashing cylinder.

FIG. 11A is a cross-sectional view of the asymmetric belt shown in FIG. 11, taken along the line 11A—11A in FIG. 11.

FIG. 12 is a partial end view of the adjustable sheave shown in FIG. 11.

FIG. 17 is a partial exploded perspective view of one embodiment of a conveying conduit for conveying crops to the drum separator.

FIG. 18 is a partial side view of the back of the conveying conduit illustrated in FIG. 17.

FIG. 20 is a top view of two adjacent disk separators.

FIG. 21 is an enlarged partial view of the disk separators illustrated in FIG. 20.

FIG. 24 is an enlarged partial view of prior art disk separators.

DETAILED DESCRIPTION OF THE PREFERRED EMBODIMENTS

Figures 1, 2:
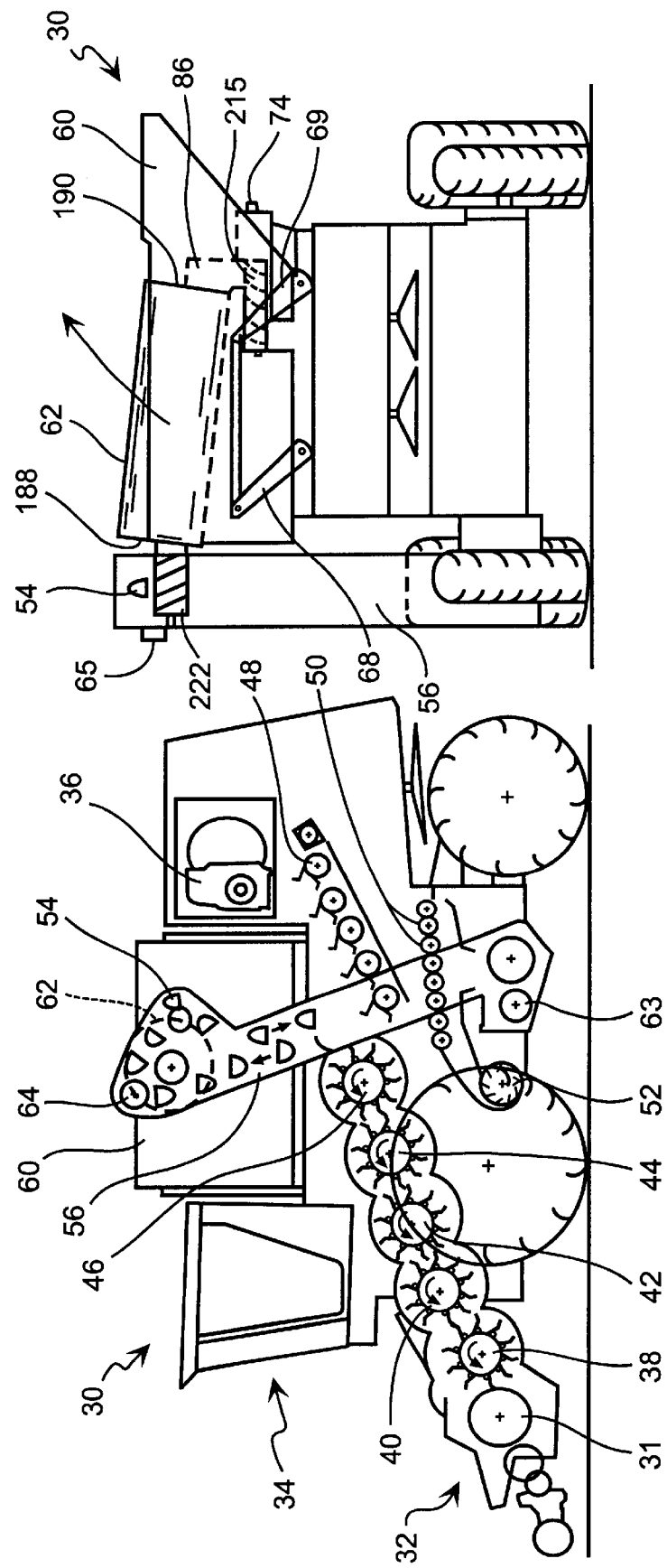
FIG. 1 is a partial operational side view of the port side of a combine according to one embodiment of the present invention.
FIG. 2 is a partial operational rear view of the combine.

In the following description, like reference numerals refer to like parts. FIGS. 1 and 2 illustrate one embodiment of a combine according to the present invention. The preferred combine 30 is a bean combine that is configured to harvest beans. Although the following description concerns the construction and operation of the bean combine 30, the following description is also applicable to other types of combines for harvesting other crops.

The combine 30 separates beans from bean laden vines and includes various components and assemblies for performing this function. The combine 30 illustrated in FIG. 1 is a self-propelled combine, as indicated by the combustion motor 36 included in the combine 30. Although the combine 30 illustrated in FIG. 1 is self-propelled, its various aspects of are also applicable to trailer or pull-type combines. In this case, the combine would include a tongue for attaching the combine to a tractor or similar towing vehicle. Such a trailer type combine would include a shaft through which rotational power is transferred from the tractor to the combine.

The combine 30 illustrated in the figures includes a header 32 that has been attached to the combine. The header 32 may be of the type that picks up plants that have been dug up from the ground or another type that cuts and picks up plants at their roots. In the embodiment illustrated in FIG. 1, the combine 30 includes a windrow header 32 which is configured to pick up windrows of dug up bean plants in a bean field. This type of header is of a conventional type commonly used on, for example, peanut combines. After a digger has dug up the bean plants and has placed windrows of bean plants on the bean field, the header 32 of the combine 30 will pick up the windrows of bean laden vines for processing by the combine. The combine 30 travels along a windrow via the wheels of the combine as the combine is self-propelled or either pulled by a tractor.

Referring to FIG. 1, the header 32 of the combine 30 rotatingly picks up the bean vines and delivers them to an auger 31. Generally speaking, the header 32 spans the width of the combine 30 such that it may pick up very wide windrows of bean laden vines. The auger delivers the bean laden vines to the picking system located in the combine 30. The picking system includes a plurality of thrashing cylinders 38, 40, 42, 44, 46. Vines and beans which are carried by the auger 31 are swept toward the first thrashing cylinder 38 by the counterclockwise rotation of the picking cylinder fingers or tines 91 (illustrated in FIGS. 6 and 8 in greater detail).

Figure 3A:
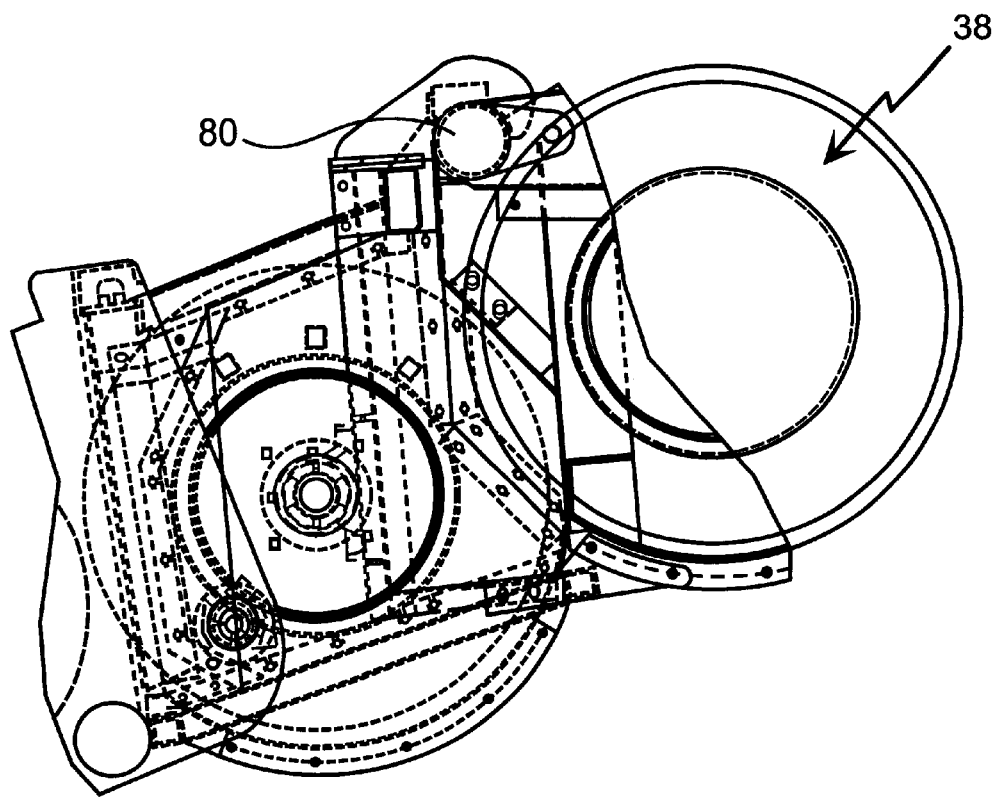
FIG. 3A is a detailed side view of encircled portion 3A of FIG. 3.
Figure 5:
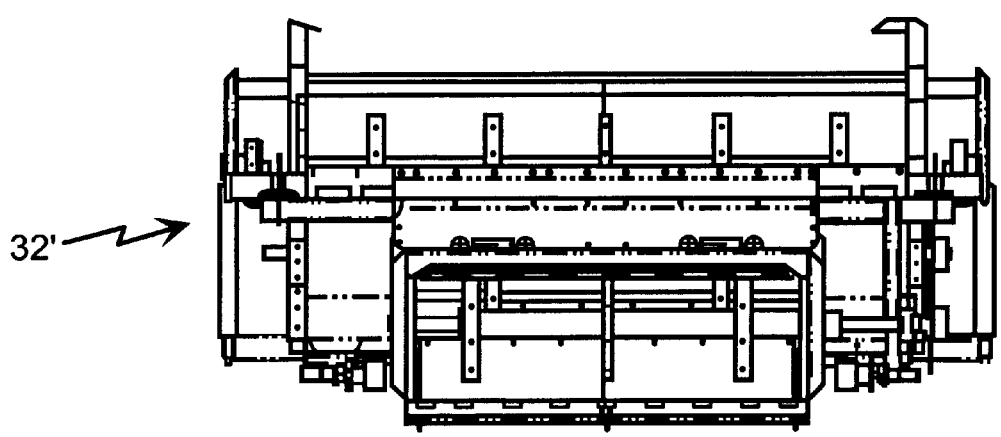
FIG. 5 is a front view of the header and feeder house illustrated in FIG. 3.

FIGS. 3–5 illustrate details of another header 32' that may be used with the combine 30. The header 32' illustrated in FIGS. 3–5 is a conventional header that is used in the bean industry. Headers similar to that shown in FIGS. 3–5 that may be used with the combine 30 are commercially available. The header 32' is attached to a hitch tube 80, which is connected to the support arm 76 of the feeder house 75. The feeder house 75 includes an actuator 78 which may be actuated to cause the header 32 to rise and fall by pivoting about a pivot 77. The construction of the feeder house 75 is described in detail in U.S. patent application Ser. No. 08/733,184, the entire disclosure of which is hereby incorporated by reference.

As depicted in FIGS. 3 and 4, an intermediate thrashing cylinder 71 or transfer thrashing cylinder is located between the header 32' and the feeder house 75. The intermediate thrashing cylinder includes a plurality flexible fingers (not illustrated) and is similar to the thrashing cylinders described below, except for its shorter length. The function of the intermediate thrashing cylinder 71 is to transfer the bean laden vines to the first thrashing cylinder 38. The cab 34 of the combine 30 is located above the header 32' so an operator of the combine has a clear view of the activities near the header 32'.

Generally speaking, the thrashing cylinders 38, 40, 42, 44, 46 pick the beans from the bean laden vines. This is obtained by subjecting the bean laden vines to a "thrashing" motion, i.e., the bean laden vines are whipped by the fingers of a thrashing cylinder at one speed and are subjected to the fingers of an adjacent thrashing cylinder whose fingers are traveling at a different speed, but the same rotational direction. This effect is further enhanced because the fingers of adjacent thrashing cylinders mesh or overlap in the area where the vines and beans are transferred from one thrashing cylinder to another. In doing so, the thrashing cylinders 38, 40, 42, 44, 46 also remove debris, such as dirt, from the bean laden vines by moving the vines along the screens 106 (see FIGS. 6 and 7). The thrashing cylinders 38, 40, 42, 44, 46 also card the vines by bending or tearing the vines into smaller pieces. The thrashing action of the thrashing cylinders 38, 40, 42, 44, 46 also shells the beans from their pods so as to create "shelled beans" and "shelled pods."

After the beans have been picked from the vines or have been shelled by the thrashing cylinders 38, 40, 42, 44, 46, the beans and the vines are transferred to the rear separators 48. The rear separators 48 further separate the beans from the vines by subjecting the crops to another thrashing-like motion and discharge the majority of the vines from the combine, retaining the shelled and unshelled beans. The rear separators 48 are similar to that described in U.S. Pat. No. 5,138,826, the entire disclosure of which is hereby incorporated by reference. The shelled and unshelled beans that fall through the rear separators 48 fall down a flat plate located directly underneath the rear separators 48.

Thereafter, the shelled and unshelled beans are transferred to the front portion of a plurality of disk separators 50, where further debris, such as light sticks and empty pods, are separated from the shelled and unshelled beans. At the location of the disk separators 50, the beans are blown from below with air from a fan or blower 52, which is also of conventional design. The airflow from the fan 52 discharges dirt, dust, leaves, etc. from the shelled and unshelled beans. This debris is discharged from the combine 30. The shelled and unshelled beans fall through openings in the disk separators 50 and are then transferred via an auger 63 to the bottom of a conveying conduit 56.

After the beans have been transferred to the bottom of the conveying conduit 56, a conveyor in the conduit 56 conveys the shelled and unshelled beans upward to a drum separator 62. The drum separator 62 separates the shelled beans from the unshelled beans. The shelled beans fall from the drum separator into a bin 60 where they are stored. The unshelled beans that have been separated from the shelled beans by the drum separator 62 are delivered back to the thrashing cylinders via the passageway 86, 216, 88 so that the remaining unshelled pods will be shelled by the thrashing cylinders. In this manner, the unshelled beans are held in a loop in the combine 30 until they are shelled. This is generally referred to as a "tailings return system," where the unshelled beans are the "tailings."

After all the beans have been shelled and are located in the bin 60, the shelled beans may be dumped from the bin 60 by rotating the bin with the levers 68, 69 such that the bin 60 rotates relative to horizontal and the remainder of the combine 30 (see the arrow above the drum separator 62 in FIG. 2). This permits the shelled beans in the bin 60 to be dumped into another container, such as a truck. A more detailed description of the particular features of the combine 30 follows.

Referring again to the thrashing cylinders 38, 40, 42, 44, 46, because it is necessary to remove the beans from their pods, i.e., to shell the beans, more thrashing ability is needed in the combine 30 as compared with many conventional combines. However, thrashing the beans tends to damage the beans. Hence, conventional combines do not typically use a plurality of thrashing cylinders, but instead use only one thrashing cylinder so as to minimize the amount of times the beans are struck by the fingers of the trashing cylinders. This configuration was thought to minimize the amount of damage caused to the beans. However, the Applicants discovered that it is not necessarily how many time you strike the beans that causes damage to the beans, but how hard the beans are hit that causes the damage. Hence, going against the wisdom of conventional bean combines, the combine 30 of the present invention includes a plurality of thrashing cylinders 38, 40, 42, 44, 46, rather than one thrashing cylinder.

The first three thrashing cylinders 38, 40, 42 of the combine 30 are chain driven, while the last two thrashing cylinders 44, 46 are belt driven. The purpose of the first three thrashing cylinders 38, 40, 42 is to essentially convey the beans and plants up to the fourth thrashing cylinder 44, as opposed to shelling all the beans at once. Thus, the first three thrashing cylinders run progressively from 60 rpm to 100 rpm, speeds slower than a conventional bean combine thrashing cylinder. Typically, the beans are located in bean laden vines, which often are in windrows and thus include soil. Hence, the beans are carried with wads of soil into the combine 30. Because wads of soil and vines enter the combine, the first three thrashing cylinders 38, 40, 42 must be able to transfer sufficient torque to break-up the wads. Because the thrashing cylinders 38, 40, 42 are chain driven, they can easily handle the spike torques that are created by wads of crop material. Consequently, the first three thrashing cylinders 38, 40, 42 are used to feed the crop material into the combine 30 and break up the wads. Because the thrashing cylinders 38, 40, 42 are chain driven, they sustain the high spike torques that are necessary to break up the wads of crop material. In this manner, the first three thrashing cylinders 38, 40, 42 condition the crop material in the combine 30 so as to prepare it for delivery to the fourth and fifth thrashing cylinders 44, 46. Additionally, the first three thrashing cylinders 38, 40, 42 are also used to remove some of the soil and dirt from the plants, especially if the entire bean plant has been plowed from the earth and placed in a windrow.

Figure 6:
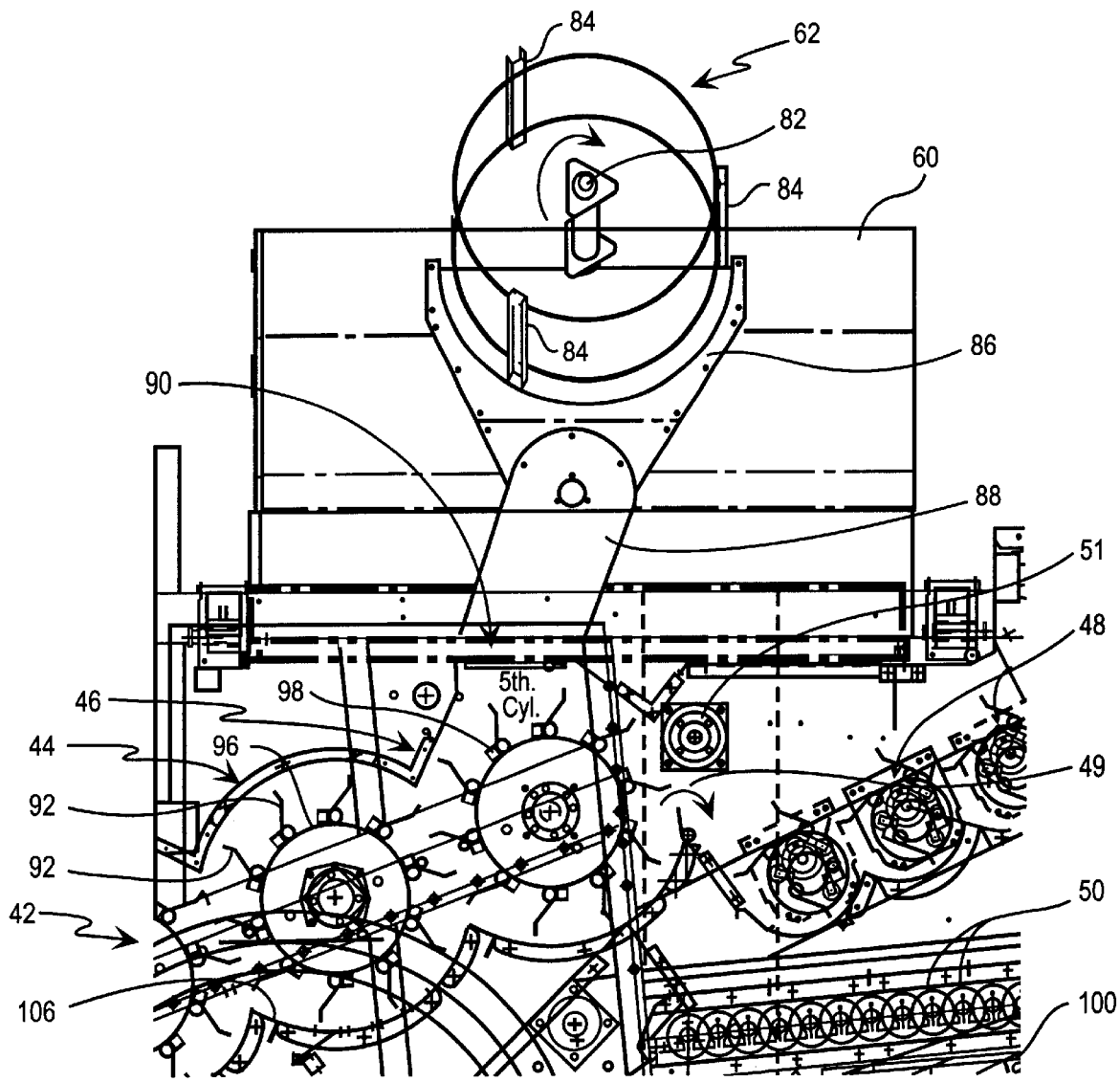
FIG. 6 illustrates a partial side view of the interior of the combine.

Referring to FIGS. 6 and 7, concave plates 106 are located under the bottom side of the thrashing cylinders 38, 40, 42, 44, 46. The concave plates 106 each include a plurality of openings 108 that permit dirt, soil, and other debris to fall therethrough so as to exit the combine 30. Preferably, the openings 108 are ⅛ by 3 inch openings so as to prevent shelled and unshelled beans from passing therethrough. Hence, the first three thrashing cylinders 38, 40, 42 are also used for dirt and debris extraction. Because these first three cylinders 38, 40, 42 are rotating at such slow speeds, they tend to not remove the majority of the beans from the vines or shell the pods. Rather, the majority of the shelling occurs in the last two cylinders 44, 46, which rotate at higher speeds than the previous three cylinders, depending upon the conditions at the time of harvesting. Hence, the aim of the first three thrashing cylinders 38, 40, 42 is not to shell the beans from the pods, although some shelling will naturally occur. Rather, these three thrashing cylinders 38, 40, 42 break up whatever wads may be ingested into the combine 30 by the header 32 and basically spread the material out across the width of the combine to homogenize the material and make it a more uniform feed to the fourth and fifth thrashing cylinders 44, 46, where these last two thrashing cylinders remove the beans from their pods. The concave plate 106 of the last or fifth thrashing cylinder 46 includes openings 112 of a size larger than the openings 108. The openings 112 permit shelled and unshelled beans to pass directly to the disk separators 50. The remaining crop material will exit the last thrashing cylinder assembly 46 at the opening 49 located toward the rear of the fifth thrashing cylinder assembly (see FIG. 6), where it will be conveyed to the rear separators 48.

Because of changing harvesting conditions, it is desirable to be able to vary the rotational speed of at least one of the last two thrashing cylinders 44, 46. Depending upon the conditions, it may be necessary to rotate the fourth and fifth thrashing cylinders 44, 46 at much higher speeds to create a greater thrashing effect. Likewise, in other instances it is desirable to rotate the fourth and fifth thrashing cylinders 44, 46 at a much lower speeds because of the harvesting conditions. For example, if the beans are extremely dry, they tend to damage more easily than beans that have some humidity or wetness. In this case, the speed of the fourth and fifth thrashing cylinders 44, 46 may be reduced so as to lessen the chances of beans being damaged. To change the rotational speed of the fourth and fifth thrashing cylinders 44, 46, the combine 30 includes a variable speed drive 116. An operator of the combine 30 can vary the rotational speed of at least of the thrashing cylinders, preferably the fourth and fifth thrashing cylinders 44, 46, with the variable speed drive 116. The variable speed drive 116 according to one embodiment of the present invention is illustrated in FIGS. 9, 11, and 12.

The variable speed drive 116 preferably permits the rotational speed of the fourth and fifth thrashing cylinders 44, 46 to be varied between 100 rpm and 250 rpm. These speeds permit an operator of the combine 30 to easily adjust the rotational speed of the thrashing cylinders 44, 46 to speeds that are more favorable to the specific harvesting conditions, i.e., speeds at which the maximum amount of beans are shelled without damaging the beans. The variable speed drive 116 include an adjustable sheave 158, as described below.

Figure 9:
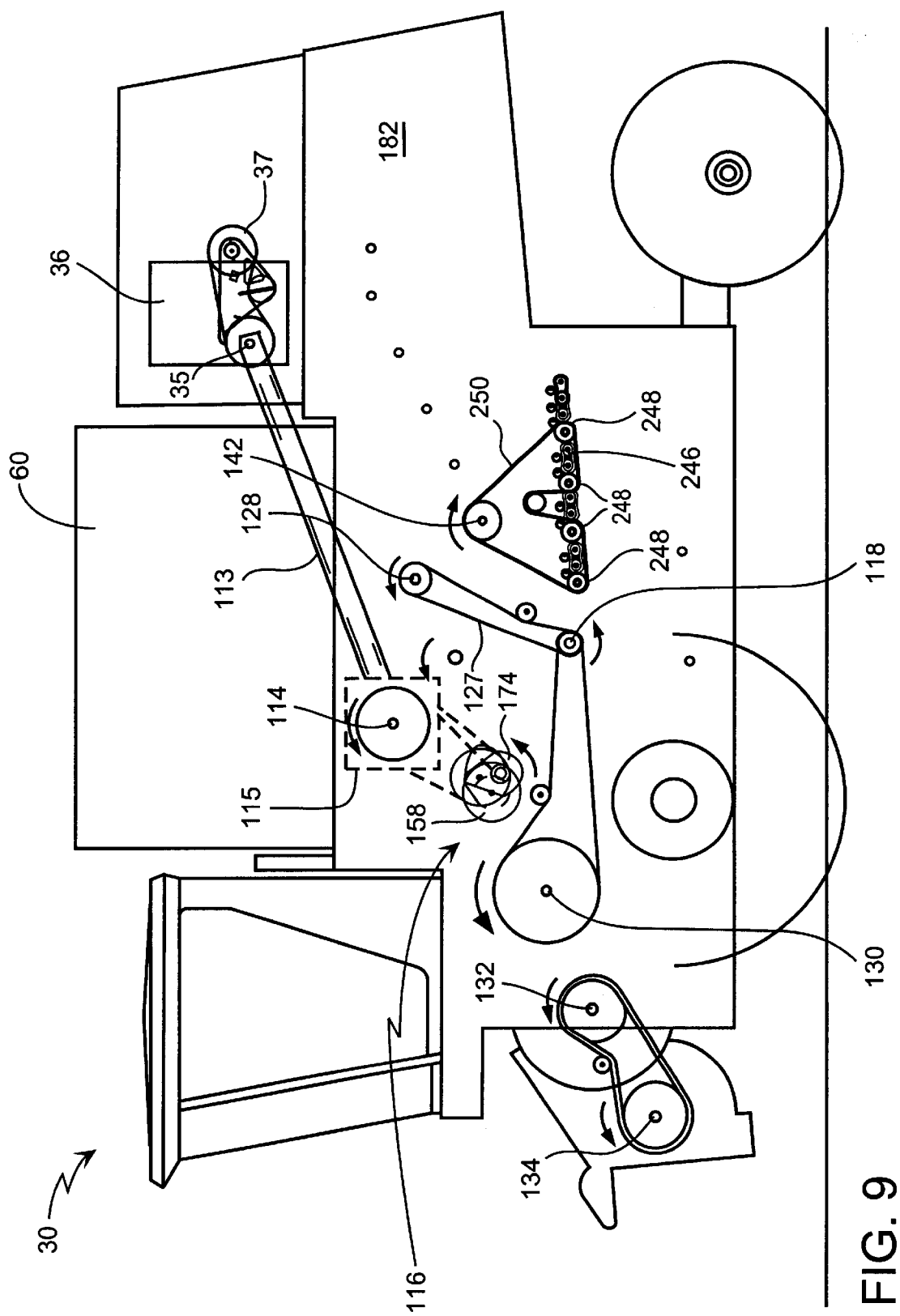
FIG. 9 is a diagrammatic side view of the port side of the combine.
Figure 10:
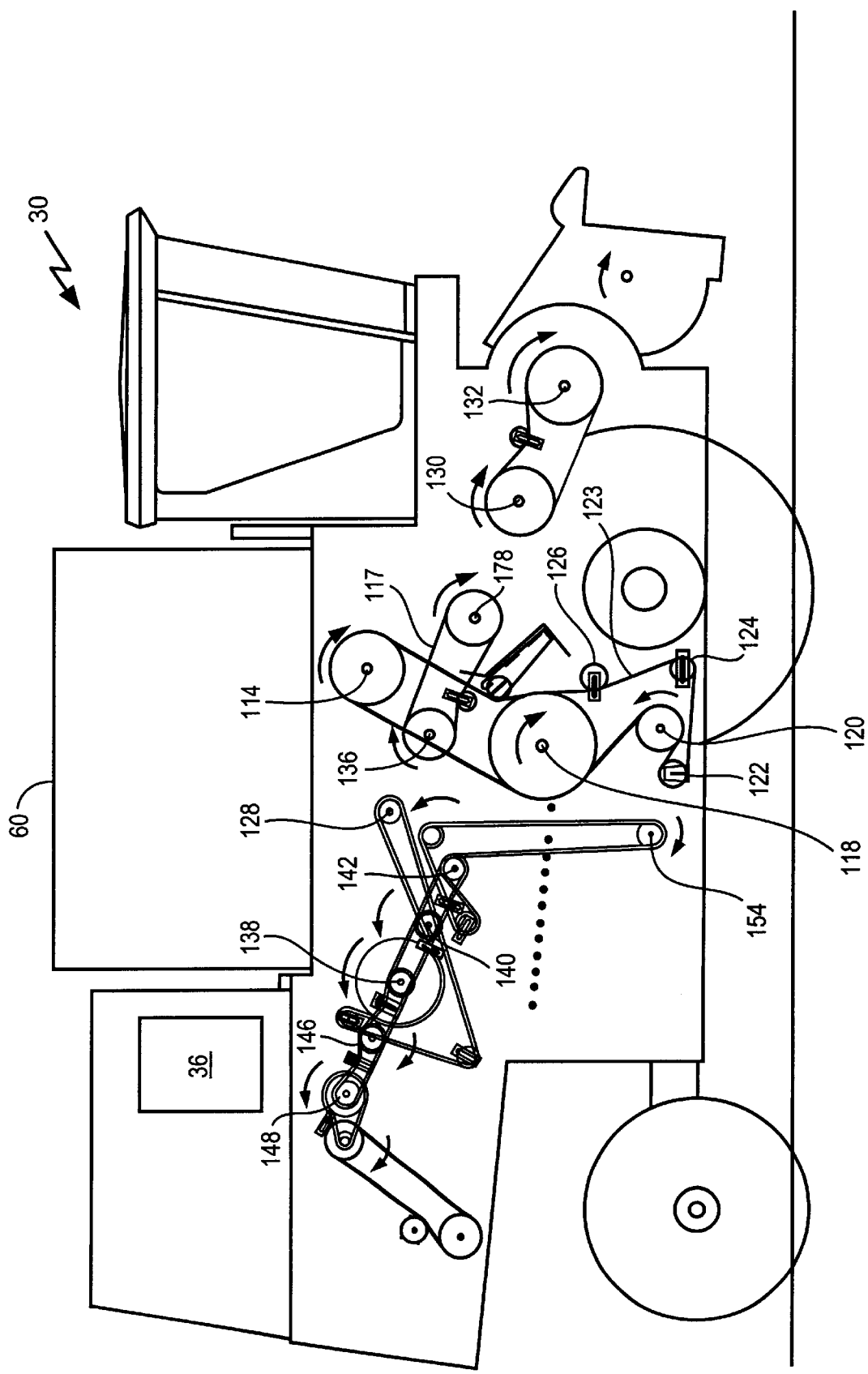
FIG. 10 is a diagrammatic side view of the starboard side of the combine.

As illustrated in FIG. 9, the motor 36 of the combine 30 includes a motor drive shaft 35, which is coupled to a hydraulic pump 37 via a belt and sheave assembly. The hydraulic pump 37 is used to create hydraulic pressure for various hydraulic components of the combine 30. The motor drive shaft 35 is also coupled via a main drive shaft 113 to a gear box 115. The gear box 115 is essentially a right angle transmission device that transmits rotation of the main drive shaft 113 to the main jack shaft 114. The main jack shaft 114 extends from the port side of the combine to the starboard side of the combine, as illustrated in FIGS. 9 and 10. FIG. 9 illustrates the port side of the combine 30, while FIG. 10 illustrates the starboard side of the combine.

As depicted in FIGS. 9 and 11, the main jack shaft 114 rotates in a counterclockwise direction and is coupled to a sheave or pulley 156. The sheave 156 is rotatably connected to the main jack shaft 114 such that the two rotate in unison. The sheave 156 is in turn coupled to an adjustable sheave 158 via an asymmetric belt 160. Hence, the belt 160 transfers rotation of the sheave 156 to the adjustable sheave 158. The adjustable sheave 158 of the variable speed drive 116 is different from the sheave 156 because the width of the sheave 158 (measured along the sheave's axis of rotation) is variable (see the arrow in FIG. 12), while the width of the sheave 156 is fixed. The adjustable sheave 158 includes a beveled disk 164 and a straight disk 162 that together define the sheave 158. As described below, either the flat disk 162, the beveled disk 164, or both discs 162, 164 are movable in relation to one another such that the belt 160 may move toward and away from the rotation shaft 178 of the adjustable sheave 158. The discs 162, 164 are essentially spring loaded such that they are biased to move toward one another. Hence, the sheave 158 is a variable pitch pulley.

The rotational speed of the adjustable sheave 158 may be varied by causing the belt 160 to move toward or away from the rotation center of the adjustable sheave 158. By causing the belt 160 to move toward the rotation center, the rotational velocity of the sheave 158 increases. Likewise, by causing the belt 160 to move away from the rotation center, the rotational speed of the sheave 158 decreases. This effect is achieved by rotating an arm 174 about a pivot 176. The pivot 176 is mounted to the body 182 of the combine 30. The arm 174 is pivotally mounted to the pivot 176 so as to be freely rotatable about the pivot 176. A first end of the arm 174 is also connected to the sheave 158, preferably at or near the rotation center such that when the arm 174 is rotated about the pivot 176, the sheave 158 also rotates. The other end of the arm 174 is connected to a rod 172 via another pivot 180. The rod 172 is rotatably coupled to the arm 174 via the pivot 180.

The rod 172 is part of an actuation device 166. The actuation device 166 causes the arm 174 to rotate about the pivot 176 so that the adjustable sheave 158 also rotates about the pivot 176. In the preferred embodiment, the actuation device 166 includes an electric reversible motor 171 that is coupled to a lead screw. By causing the motor 171 to rotate in a first direction, the lead screw will advance and cause the rod 172 to move in a direction toward the arm 174. By causing the motor 171 to rotate in a reverse direction, the led screw will retract and cause the rod 172 to move in a direction away from the arm 174. The reversible motor 171 is connected to a control lever or switch (not illustrated) in the cab 34 of the combine 30 via the line 168. The actuation device 166 is also connected to the body 182 of the combine via a connector 170. By operating a control switch within the cab 34 of the combine 30, an operator causes the motor 171 to operate to cause the actuation device to actuate such that the arm 174 is rotated about the pivot 176.

Although the above described actuation device 116 is preferred, other actuation devices are contemplated. For example, the actuation device 116 may be a hydraulic piston that is caused to actuate via an electronic or mechanical valve. Additionally, the actuation device can be configured to move the sheave 158 in other manners. For example, the rod 172 can be directly coupled to the sheave 158 such that the sheave follows the path of movement of the rod.

By activating the actuation device 166 the rod 172 will move away from or toward the connector 170. When the rod 172 moves, the arm 174 also moves via the pivotal connection 180 between the rod and the arm. Because the arm 174 is pivotally connected to the body 182, the arm 174 rotates about the pivot 176. Because the arm 174 is connected to the adjustable sheave 158, the sheave 158 also moves with the rotation of the arm 174. In the preferred configuration, the sheave 158 follows the rotational path of the arm 174 as indicated by the arrow 175, depicted in FIG. 11.

By causing the arm 174 to rotate about the pivot 176 in a clockwise direction, the sheave 158 will move in a general direction toward the sheave 156. That is, the distance between the sheave 156 and the sheave 158 is lessened. This will place less tension on the spring-loaded discs 162, 164 of the sheave 158 such that the discs 162, 164 move toward one another. When this occurs, the belt 160 slides away from the rotational center of the sheave 158. In this manner, the rotational speed of the sheave 158 will decrease. On the other hand, if the arm 174 is caused to rotate in a counter-clockwise direction about the pivot 176, the sheave 158 will move in a direction away from the sheave 156 such that the distance between the sheave 156 and the sheave 158 is increased. This will place more tension on the spring-loaded discs 162, 164 of the sheave 158 such that the width of the sheave 158 increases, i.e., one or both of the discs 162, 164 will move away from the other. This causes the belt 160 to slide toward the center of the sheave 158 and thus increase the rotational velocity of the sheave 158. In this manner, the rotational velocity of the sheave 158 may be varied during the operation of the combine 30.

The adjustable sheave 158 is also connected to the shaft 178 of the fourth thrashing cylinder 44 such that the rotation of the sheave 158 causes the fourth thrashing cylinder 44 to rotate. Hence, when the rotational velocity of the sheave 158 is varied, the rotational velocity of the thrashing cylinder 44 is also varied. In this manner, an operator of the combine 30 may adjust the rotational velocity of the thrashing cylinder 44. Adjustable sheaves 158 that may be used for the variable speed drive 116 are commercially available from a variety of sources.

The above-described adjustable sheave 158 is of the asymmetric type. That is, the disk 158 includes a beveled surface, while the disk 162 does not. The disk 162 opposes the beveled disk 164. As shown in FIG. 1A, the cross-section of the belt is also asymmetric. That is, the belt 160 preferably includes a beveled surface 161 that matches the bevel angle of the beveled disk 164, while the opposite side of the belt is not beveled. Hence, the cross-sectional shape of the belt matches the groove formed by the disks 162, 164 of the sheave 158 such that the belt 160 will move relative to the rotation center while located in the groove of the sheave. The rotational speed of the sheave 158 is adjustable while the sheave is rotating.

Other variable speed drive devices are also contemplated for controlling the speed of at least one of the thrashing cylinders 38, 40, 42, 44, 46. For example, the variable speed drive may include a symmetrical sheave and a symmetrical belt which changes the pitch of the sheave to produce a variable speed. Additionally, the rotational speed of the drive sheave 156 may be varied so as to vary the speed of the driven sheave 158. The variable speed drive device may also be a variable speed hydraulic motor coupled to the gear box 115 or run directly from the pump 37. The variable speed drive device may also an adjustable speed transmission device, or a variable speed electric motor that varies the speed of at least one of the thrashing cylinders.

The variable speed drive 116 of the embodiment illustrated in FIGS. 11 and 12 is essentially a reducer that changes the pitch length between the center line of the drive pulley 156 and the center line of the driven pulley 158. Because the belt 160 does not change lengths, it falls down into the variable speed pulley, consequently changing the pitch diameter and changing the rotational speed. Because the speed of the thrashing cylinders 44, 46 is adjustable, the amount of thrashing that is carried out is adjustable. After the first three thrashing cylinders 38, 40, 42 have conditioned the crop material, the crop material is ready to be thrashed by the fourth and fifth thrashing cylinders 44, 46. The operator can adjust the rotational speed of the fourth and fifth thrashing cylinders 44, 46 to a speed that is suitable for the harvesting conditions. If the beans are moist, the operator may increase the rotational speed of the fourth and fifth thrashing cylinders 44, 46. If the conditions are dry, the beans are easily damaged, and the operator of the combine 30 may decrease the rotational speed of the thrashing cylinders 44, 46.

FIGS. 9 and 10 illustrate the mechanism that drives the thrashing cylinders 38, 40, 42, 44, 46 of the combine 30. As described earlier, FIG. 9 illustrates the port side of the combine 30, while FIG. 10 illustrates the starboard side of the peanut combine. As shown on the port side of the combine 30, the main jack shaft 114 is coupled to the motor drive shaft 35 via the main drive shaft 113 and gear box 115. As shown on the starboard side of the combine 30, the sheave of the main jack shaft 114 is coupled via a belt 123 to the sheave of the center shaft 118, located near the center of the combine. Hence, the main jack shaft 114 drives the center shaft 118. The belt 123 that drives the sheave of the center shaft 118 also drives the sheave of the shaft 120, which drives the blower 52. A series of idler sheaves 122, 124, 126 are also located along the belt 123 to properly tension and route the belt 123.

As shown on the port side of the combine 30, the center shaft 118 also drives the shaft 128 of a stripping cylinder 51 (see FIG. 6) via a chain 127. Another chain 129 is also coupled to the sheave or gear of the center shaft 118 and drives a sheave connected to the shaft 130 of the third thrashing cylinder 42. Thus, the third thrashing cylinder is chain driven. As shown on the starboard side of the combine 30, the shaft 130 is coupled to the sheave of the shaft 132 of the second thrashing cylinder 40 via a chain so that the second thrashing cylinder is driven off of the third thrashing cylinder. Hence, the second thrashing cylinder is also chain driven. The second thrashing cylinder 40 may include a fixed gear reduction to reduce the speed of the second thrashing cylinder relative to that of the third thrashing cylinder. As shown on the port side of the combine 30, the shaft 132 is coupled to the sheave of the shaft 134 of the first thrashing cylinder 38 via a chain so that the first thrashing cylinder 38 is driven off of the second thrashing cylinder 40. Hence, the first thrashing cylinder 38 is also chain driven. The first thrashing cylinder 38 may include a fixed gear reduction to reduce the speed of the first thrashing cylinder 38 relative to that of the second thrashing cylinder 40. As shown on the starboard side of the combine 30, the sheave of the shaft 178, which rotates at the same speed as the adjustable sheave 158, is coupled to the sheave of the shaft 136 of the fifth thrashing cylinder 46 via a chain 117 so that the fifth thrashing cylinder 46 is driven off of the fourth thrashing cylinder 44. Thus, the fourth thrashing cylinder 44 is belt driven, while the fifth thrashing cylinder is chain driven 46. When the rotational speed of the fourth thrashing cylinder 44 is varied as described above, the rotational speed of the fifth thrashing cylinder 46 correspondingly varies. The fifth thrashing cylinder 46 may include a transmission to reduce or increase the speed of the fifth thrashing cylinder 46 relative to that of the fourth thrashing cylinder 44. Thus, the fifth thrashing cylinder 46 can rotate at the same or a different speed than that of the fourth thrashing cylinder 44. From the foregoing, it will be appreciated that the thrashing cylinders 38, 40, 42, 44, 46 all rotate counter clockwise.

The thrashing cylinders 38, 40, 42, 44, 46 generally span the width between the walls of the combine 30, and each include a respective shaft 134, 132, 130, 178, 136, which are each journaled with bearings (not shown) roughly near the sidewalls of the combine housing.

Besides the rotational speed of the thrashing cylinders 38, 40, 42, 44, 46, the configuration of the thrashing cylinders also dictates the amount of thrashing that occurs. Each of the thrashing cylinders, 38, 40, 42, 44, 46 includes a plurality of finger sets 92, such as the spring steel tines (double torsion 2 ½ inch springs tines) illustrated in FIGS. 6 and 8. Each of the finger sets 92 includes two fingers 91. The fingers 91 include a tip or outer end. The first thrashing cylinder 38 includes roughly half the number of fingers sets 92 that are on the second thrashing cylinder 40, and the third thrashing cylinder 42 includes roughly double the amount of springs that are on the second thrashing cylinder 40. The number of finger sets 92 on the first thrashing cylinder 38 is referred to as "half density." The number of finger sets 92 on the second thrashing cylinder 40 is referred to as "single density," and the number of finger sets 92 on each of the third, fourth, and fifth thrashing cylinders 42, 44, 46 is referred to as "double density." Hence, the third thrashing cylinder 42 has roughly quadruple the number of springs as the first thrashing cylinder 38, and the third, fourth, and fifth thrashing cylinders include the same number of finger sets 92. By having a lesser number of finger sets 92 on the first two thrashing cylinders 38, 40 as compared with each of the third, fourth, and fifth thrashing cylinders 42, 44, 46, the first two thrashing cylinders are more effective at conditioning the product for feeding to the fourth cylinder 44, rather than shelling the beans.

More particularly, the first thrashing cylinder 38 includes the shaft 134 having five discs or rings 103 mounted thereon. The rings 103 are equally spaced along the length of the shaft 134. Mounted to the rings 103 are a plurality of bars 98 that are parallel with the shaft 134. Preferably, the thrashing cylinders each include ten bars 98 equally spaced along the circumference of the rings 103. Each bar 98 extends laterally and equally between the combine sidewalls and carries sets of the radially extending flexible fingers 91 that are laterally spaced along the bar. Each set 92 of the fingers 91 on one bar 98 are axially staggered with respect to those on an adjacent bar, so that no one set of fingers on one bar follows the same path as the set on a circumferentially adjacent bar as the thrashing cylinder rotates. Each of the thrashing cylinders 38, 40, 42, 44, 46 are substantially identical, except for the number of finger sets 92 per thrashing cylinder. The flexible fingers 91 are disposed on the bars 98 of adjacent thrashing cylinders in a staggered fashion such the fingers 91 of adjacent thrashing cylinders alternate with each other. The thrashing cylinder are adjacent to each other such that fingers of adjacent thrashing cylinders interdigitate when the adjacent thrashing cylinders rotate.

The first thrashing cylinder 38 is disposed within a casing having an oppositely located upper and lower cover. The lower cover includes the concave screen or arcuate lower section 106. The thrashing cylinders 38, 40, 42, 44, 46 are each located above a concave screen 106 and are each partially concentric therewith. The concave screens 106 below each of the thrashing cylinders 38, 40, 42, 44, 46 are of similar construction. The concave screens 106 generally span the distance between the walls of the combine 30 such that each of the thrashing cylinders 38, 40, 42, 44, 46 is at least partially encased.

The spacing between the thrashing cylinders and the concave screens 106 is such that the fingers 91 will contact bean laden vines lying on the concave screens as a thrashing cylinder is rotated in a counterclockwise direction. This moves the bean laden vines over the concave screens 106.

As described earlier, each of the concave screens 106 includes a plurality of perforations 108 large enough to permit dirt and granules on the bean laden vines to fall therethrough, but small enough to not permit the shelled or unshelled beans to fall therethrough. As the bean laden vines are forced to cross the concave screens 106 by the rotation of the fingers 92, the dirt thereon falls through the perforations log in the screens and is expelled from the combine 30. As illustrated in FIG. 1, the thrashing cylinders 38, 40, 42, 44, 46 are preferably located along an incline, which promotes better dirt screening efficiency and enhances the picking process.

As illustrated in FIGS. 1 and 6, the upper cover of the casing includes a plurality of guide covers or arcuate upper sections. The guide covers cover the tops of the thrashing cylinders to prevent bailing of vines from forming above the thrashing cylinders. The guide covers located above the thrashing cylinders are arcuate and generally concentric with the circular path followed or defined by the rotating finger tips.

The distance between the fingers 91 on a finger set 92 is preferably 2 ½ inches. The first thrashing cylinder preferably includes ten of the bars 98, equally spaced about the circumference of the cylindrical disks 103. In the first thrashing cylinder 38, the fingers 92 are only located on every other bar. Thus, in the first thrashing cylinder 38, only five bars include the finger sets 92. As shown in FIG. 7, each of the bars 98 includes a plurality of roughly ten or eleven holes spaces along the length of the bars 98. In the first thrashing cylinder, the finger sets 92 are spaced every other hole along the length of the bars 98, every other bar. Because the finger sets 92 are only located on every other bar along the circumference of the disks 103, the thrashing cylinder 38 includes half the density of a typical single density thrashing cylinder.

The second thrashing cylinder 40 includes a set the flexible finger sets 92 along every other hole 104 of every bar 98 spaced along the circumference of the rings 103. Hence, the second thrashing cylinder 40 includes twice as many flexible fingers as the first thrashing cylinder 38. The third, fourth and fifth thrashing cylinders 42, 44, 46, each include double density spacing of the flexible finger sets 92. That is, rather than having a flexible finger set 92 located along every other hole on each bar as with the second thrashing cylinder 40, the third, fourth and fifth thrashing cylinders each include a flexible finger set 92 for roughly every hole along every bar 98. Hence, the third, fourth and fifth thrashing cylinders 42, 44, 46 include double density springs having a density twice that of the second thrashing cylinder 40.

Generally speaking, the more springs that are on the thrashing cylinders, the more interactions between the flexible fingers 91 of adjacent thrashing cylinders. Thus, the first three thrashing cylinders 38, 40, 42 essentially convey the bean laden vines to homogenize the crop and knock the dirt off of the crops before delivering the crops to the fourth and fifth thrashing cylinders, 44, 46 where the crop material is thrashed by more flexible fingers 91 and preferably at a greater speed. Hence, the fourth and fifth thrashing cylinders 44, 46 do the majority of the thrashing and hence the majority of the shelling.

The sets 92 of fingers on the third and fifth thrashing cylinders are offset from those of the fourth thrashing cylinder 44 in order for the fingers to converge and pass through each other with equal space. Thus, the moving fingers between adjacent thrashing cylinders overlap. The finger tips of the thrashing cylinders preferably intersect the circular path defined by the fingertips of the fingers of an adjacent thrashing cylinder. The fingers 92 are preferably spring wire tines having a $17/64$ inch diameter.

As illustrated in FIG. 6, the fingers 91 of the finger sets 92 preferably have a negative rake or bend opposite the direction of rotation, and the tip area of the fingers are bent to a slightly positive rake. Virtually all of the operations performed by the thrashing cylinders 38, 40, 42, 44, 46 are carried out by this tip area with a positive rake. Although FIG. 8 illustrates the preferred double spring steel tines 92, other flexible fingers with different configurations are contemplated, such as tough and durable plastic arm-like members with either positive rake bends, negative rake bends, or no bends at all.

As described above, the fingers of the fourth thrashing cylinder 44 converge or interface with those of the third thrashing cylinder 42 and fifth thrashing cylinder 46, and bean laden vines carried by the third thrashing cylinder 42 are stripped away. Since the fourth thrashing cylinder 44 includes double density fingers 91 and can be moved at a greater speed than the first three thrashing cylinders 38, 40, 42, the bean laden vines are ripped apart. This sudden change in vine flow direction as well as speed causes many of the beans to be whipped from the vines and also causes the beans to be shelled. Because the speed of the fourth and fifth thrashing cylinders 44, 46 greatly influences the damage that may be imparted to shelled beans, an operator of the combine may adjust the speed of the fourth and fifth thrashing cylinders, 44, 46 such that the amount of damage is minimized. In adverse conditions where the beans are easily damaged, the fourth and fifth thrashing cylinders 44, 46 may be reduced in speed by the variable speed drive 116. In this instance, the first run through the thrashing cylinders 38, 40, 42, 44, 46 may not cause the beans to be shelled from their pods. In this case, the unshelled pods will pass from the thrashing cylinders directly to the disk separators or first to the rear separators 48 and then down to the disk separators 50. The shelled beans and unshelled pods will then fall through the disk separators 50 and be conveyed to the bottom 228 of the conveying conduit 56. An auger 63 or a similar device extends across the width of the combine 30 so as to carry shelled and unshelled beans from underneath the disk separators 50 to the bottom 228 of the conveying conduit 56.

The beans can be transported to the bottom 228 of the conveying conduit 56 by devices other than the auger 63. For example, the beans can gravity feed to the conduit 53, can be blown by air, or be mechanically moved by other devices.

The disk separators 50 are illustrated in FIGS. 1, 6, and 19–21. Each of the disk separators 50 includes a shaft 238 having a plurality of disks 236, such as that illustrated in FIGS. 19–22. The shafts 238 are journaled at each end of the shafts by the walls 240. The disks 236 are either integral with the shaft 238 or are attached thereto such that the discs rotate when the shafts rotate. For example, the disks 236 may be welded to the shaft 238. Additionally, a spacer may be located between each of the disks 236 so as to space each disk from other by the spacer. The space between each of the disks 236 is preferably wide enough to permit a shelled or unshelled bean to pass therethrough. However, adjacent disk separators 50 are positioned so that disks 236 on a first shaft 238 are positioned between the disks 236 on an adjacent shaft. Thus, adjacent shafts 238 are separated by a distance as measured from the center of each shaft. The radius of each disk is almost that of the spacing between the shafts, thus leaving only a small space between the periphery of a disk and exterior surface of the shaft adjacent it. The placement of disk assemblies in this manner creates interdigitating disks defining bean-sized openings 235.

FIG. 24 illustrates how the disks of a disk separator 51 of a conventional combine are arranged. As depicted in FIG. 24, two disks 237 on a like shaft 239 and an interdigitating disk 237' on an adjacent shaft 239' generally create two openings 231 between disks. This is because the interdigitating disks 237' on the adjacent shaft 239' essentially bisect the space between adjacent disks 237 at the midpoint between the discs on the adjacent shaft 239. Thus, this configuration provides equal sized openings 231 on each side of an interdigitating disk. However, with this conventional arrangement, the circumferential edge of a disk 237 essentially defines a pinch point 241 with an adjacent shaft. This pinch point 241 problematically tends to damage beans as the beans fall into the pinch point and are damaged.

As shown in FIGS. 20 and 21, with the disk separators 50, the disks 236 of the first shaft 238 do not bisect a midpoint of the space between adjacent disks 236' of the second shaft 238' (as measured along the length of the shaft 238'). That is, the disks 236 of the first disk separator 50 do not intersect the midpoint of a line drawn between two adjacent discs 236' of the second shaft 238'. Rather, considering one interdigitating disk 236 of the first shaft 238, the disk nearly touches a disk 236' on the second shaft 238'. This is best illustrated by FIG. 21, where it can be seen that the disks 236' of the second shaft 238' do not bisect the median or midpoint of the space between adjacent disks on the first shaft 238, but rather almost abut against an adjacent disk on the first shaft 238. In a preferred embodiment, each of the disks 236 of the first shaft 238 are spaced approximately 1/16 of an inch from adjacent disks 236' on the second shaft 238'. By arranging the disks in the above-described manner, the chances of a shelled or unshelled bean entering a pinch point between the edge of a disk 236 and the periphery of the shaft 238 are lessened because the beans tend to fall into the rectangular opening 235 defined by two disks of the first shaft 238 and two disks of the second shaft 238'. Thus, rather than falling into the pinch point between the edge of a disk 236 and the cylindrical periphery of a shaft, the beans fall into the rectangular opening 235 and thus avoid the pinch point between the edge of the disk and the shaft. This is because the flat surface of each of the disks nearly abuts against the opposing flat surface of another disk on another shaft, as opposed to bisecting the middle of the space between adjacent disks on another shaft. The interdigitation between disks of adjacent shafts is such that a major portion of the space between interdigitated disks is left open. The interdigitated disks are close to each other at one edge of the space and do not occupy a central portion of the space between disks. With this arrangement, one opening 235 essentially occurs between each pair of disks.

A rotary motion is imparted to all of the disk assemblies 50 such that they are all rotated in the same direction. The disk separators 50 are preferably arranged parallel to each other and along a common plane such that adjacent disks of adjacent disk separators interdigitate in the above described manner. The rotary motion of the disk separators 50 tends to cause debris, such as vines, to exit the rear of the combine 30. The combination of the motion of the disk separators 50 and the openings 235 is designed only to accept particles which are of the size equivalent to, or less than the dimensions of a desired bean. Any particle of a size greater than these dimensions is conveyed past the disks 236 downstream and out of the combine 30.

The blower 52 delivers an airstream to the underside of the separating disks 50. This airstream will pass air up between the disks 236 to define a uniform flow of air over the surface of the disks 236, which causes leaves, vines and other debris to be lifted out of the desired beans and thus to be separated and blown out with the mechanically separated reject material. As material is fed onto the upstream end of the disk separators 50, large material or matted material will bridge adjacent disk separators 50 and ride the tops of the disks 236 while shelled and unshelled beans drop through openings 235. If light enough, the reject material will be lifted by the airstream above the downstream disk assemblies and move to the rear of the disk separators directed by the airflow and out of the combine 30.

Figure 19:
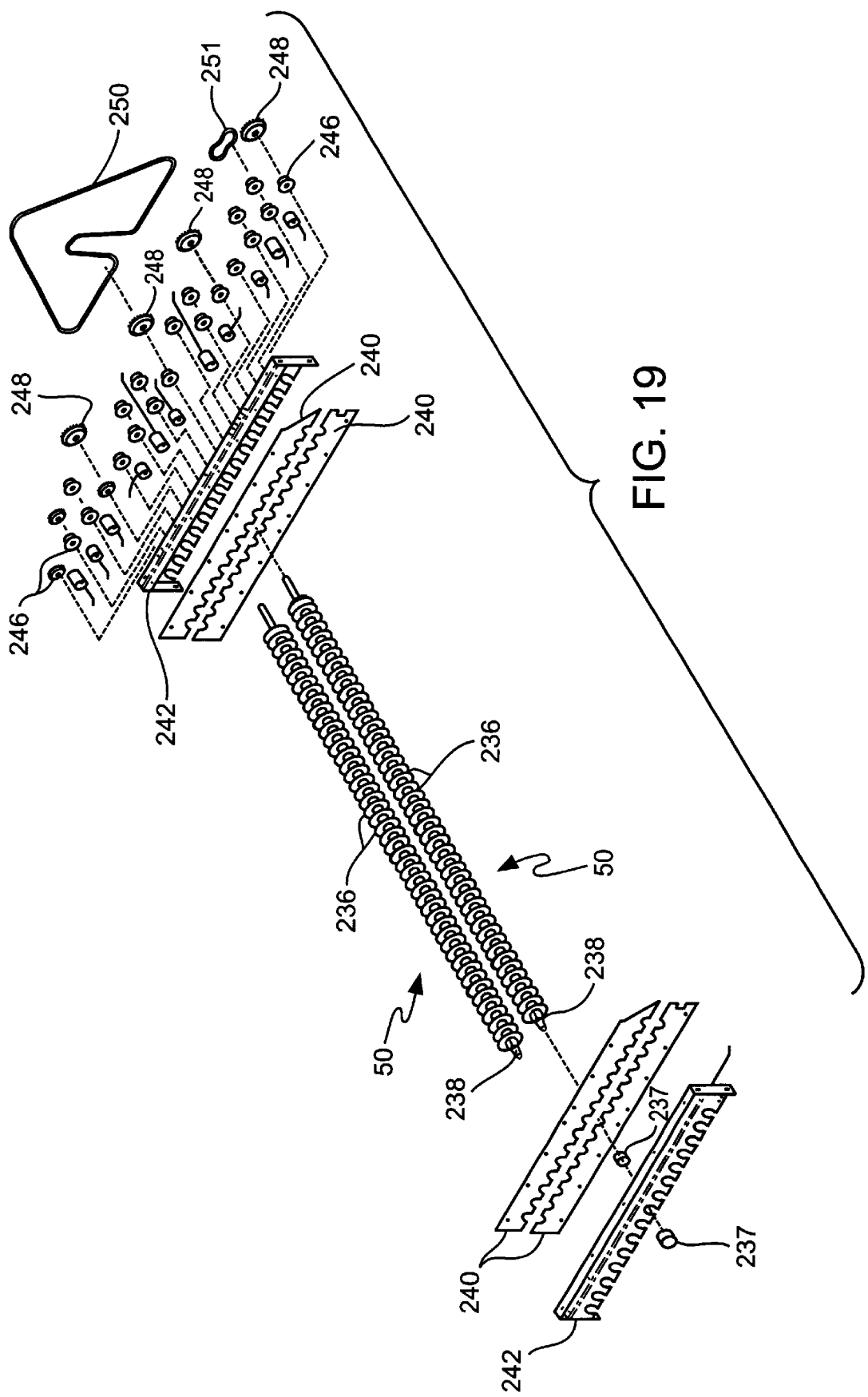
FIG. 19 is an exploded perspective view of one embodiment of disk separators of the combine.

As shown in FIGS. 9 and 19, a chain 250 drives a four large sprockets 248, which in turn drive several smaller sprockets 246. One of the large sprockets 248 is connected to a first smaller sprocket such that they rotate together. Each of the smaller sprockets is connected to the a shaft of a disk separator such that they rotate together. Hence, the first small sprocket drives a first disk separator. This first small sprocket engages an adjacent second smaller sprocket, which drives a shaft of the a second disk separator. This second smaller sprocket is then coupled to an adjacent third smaller rocket by a chain 251 and gear assembly. The third smaller sprocket drives the shaft of the third disk separator, and is also coupled to an adjacent fourth small sprocket, which drives the shaft of a fourth disk separator. The remaining disk separators 50 are driven in a similar fashion. In this manner, each of the disk separators 50 are caused to rotate in the same direction. This assembly essentially defines a daisy chain drive between adjacent disk separators 50. Preferably, no more than three or four disk separators 50 are driven off one another via the sprockets 246, 248.

Referring again to the port side of the combine 30, the main jack 118 drives the sheave or gear of a stripping cylinder shaft 128 via a chain 127. As seen on the starboard side of the combine, the sheave 128 is coupled to a plurality of sheaves or gears of the shafts 140, 142, 138, 146 and 148, which each drive one of the rear separators 48. Additionally, the shaft 142 of the first separator 48 is coupled to the shaft 154 of the auger 63 illustrated in FIG. 1. Referring to the port side of the combine, the shaft 142 of the first rear separator 48 also drives the previously described drive train 250 and sprockets 248, 246 so as to cause the disk separators 50 to rotate.

The shafts 238 of the disk separators are rotatably mounted to the holders 240 and bearing shaft support plates 242. Preferably, bearings 237 are located on opposite sides of the bearing support plate 242.

Figure 22:
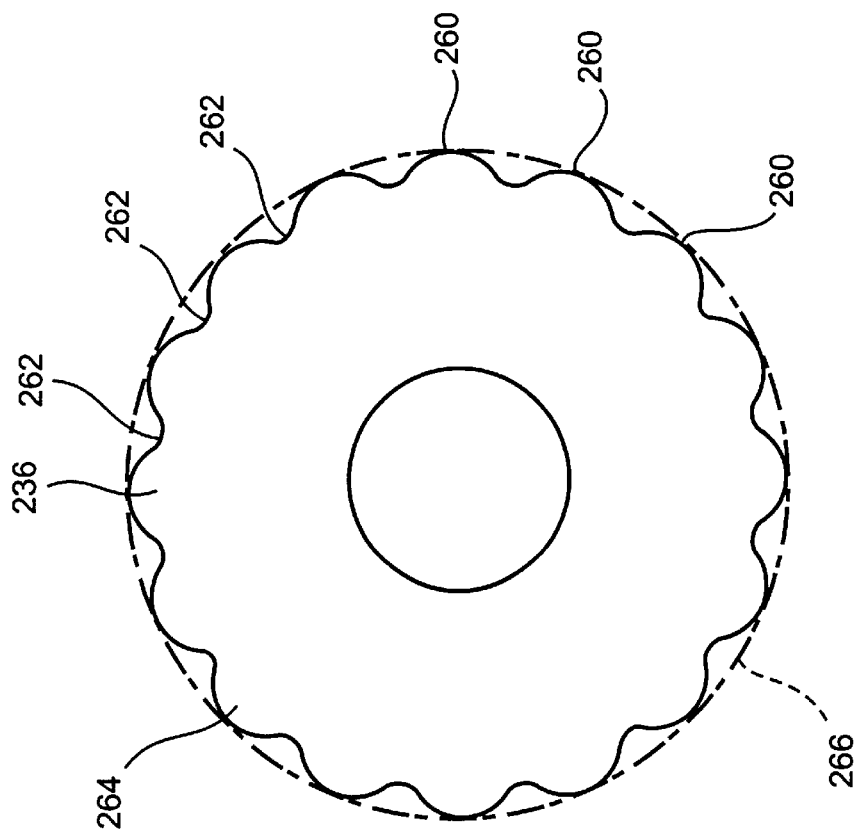
FIG. 22 is a side view of the disk of a disk separator.

FIG. 22 illustrates a side view of a disk 236 of the disk separators 50 in accordance with one embodiment of the present invention. As depicted in FIG. 22, the disk 236 includes a plurality of rounded projections 260 that are equally spaced from each other along the entire periphery of the disk 236. The projections 260 are rounded because they each include a radius at their apex that is smaller than the radius of the disk itself. The disk 236 includes a generally cylindrical periphery or circumference 266, indicated by the dashed line in FIG. 22. The disk 236 includes 16 rounded projections 260, equally spaced along the cylindrical periphery 266. The rounded projections are each separated from each other by a valley 262. The valleys 262 preferably also include a radius such that the transition between the rounded projections 260 and the valleys 262 is smooth. Together, the valleys 262 and projections 260 define a plurality of scallops 264 that define a scalloped pattern on the disk 236.

Figure 23:
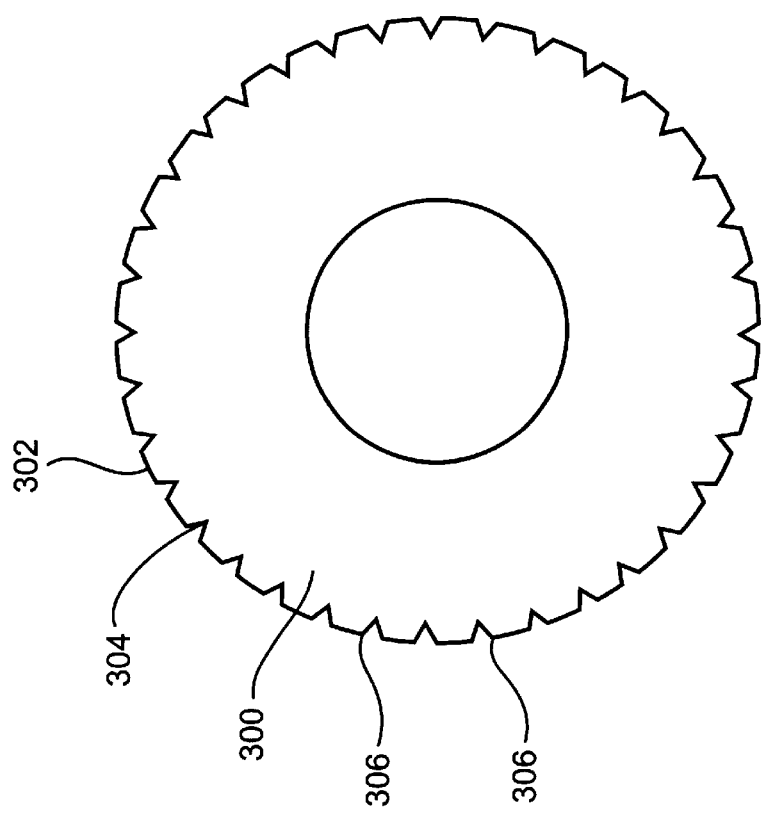
FIG. 23 is a side view of a disk of a prior art disk separator.

FIG. 23 illustrates a conventional disk 300 used with a conventional disk separator of a conventional combine. The disk 300 includes a plurality of sharp corners 306 that are created by the sharp triangular indents 304. Hence, the disk 300 includes a plurality of sharp corners 306 spaced along the cylindrical periphery of the disk 300. The sharp corners 306, while useful for disk separators in a peanut combine, cause damage to beans in a combine. While it is necessary to have valleys or indentations to help move the separated crop material along the disk separators, the sharp edges 306 of the conventional disk 300 tear the skin of beans. These sharp edges 306 work well for materials like peanuts, but are not suitable for beans and other crops. Hence, the disks 236 of the disk separators 50 according to one embodiment of the present invention include rounded projections 260, as opposed to the sharp projections 302 of the conventional disk. The rounded projections 260 in combination with the valleys 262 help convey the beans along the disk separators 50, while minimizing damage to the beans.

After the shelled and unshelled beans pass through the disk separators 50, they are conveyed by the auger 63 to the bottom of the conveying conduit 56, shown in greater detail in FIG. 17. As illustrated in FIG. 1, the conveying conduit 56 is configured to convey shelled and unshelled beans from the bottom 228 of the conduit 56 to the inlet 188 of the separating drum 62. The preferred device for conveying the beans is a bucket conveyor having a plurality of buckets 54, such as illustrated in FIG. 1. The buckets 54 grab the beans and lift them up toward the top 226 of the conduit 56. At the top 226 of the conduit 56, the buckets 54 tip and dump the beans into the receiving plate 220 located in the interior of the conduit 56. After the buckets have dumped the beans into the receiving plate 220, the buckets 54 are conveyed to the bottom of the conduit 56 where they receive more shelled and unshelled beans that have fallen through the disk separators 50. Although the buckets 54 are preferred for conveying the beans, other devices are also contemplated. For example, the beans can be conveyed by blowing the beans up to the top of the conduit 56 or by conveying the beans with an auger device.

As depicted in FIG. 2, a hydraulic motor 65 is located at the top of the conduit 56. The hydraulic motor 65 is driven by the hydraulic pump 37. The hydraulic motor 65 turns a sprocket 224 which in turn causes the buckets 54 to move through the conveying conduit via chains or belts (not illustrated). In this manner, the buckets 54 are circulated through the conveying conduit 56 so as to continually convey beans into the receiving plate 220 in the conduit 56.

The receiving plate 220 is essentially concavely shaped so as to receive beans that fall from the buckets due to gravity. The beans accumulate in the receiving plate 220 and are conveyed out of an opening 230 in the rear side of the conduit 56 by an auger 222 mounted on a shaft 234. The auger 222 is thus at least partially located in the concavity formed by the receiving plate 220 so as to convey the beans out of the opening 230. The auger is driven by either the hydraulic motor 65 or another drive device such that it rotates and causes the beans received by the receiving plate 220 to exit the opening 230. As shown in FIG. 2, the auger 222 delivers the beans from the conduit 56 to an inlet 188 of the drum separator 62. The beans preferably fall directly into the inlet 188 of the separating drum after they are conveyed from the opening 230. Although the auger 222 is preferred, the beans could also be directly conveyed to the inlet 188 by the buckets 54 or by another conveying device, such a blower.

As depicted in FIGS. 2, 6, and 13–16, the separating drum 62 includes a wall 184 having a plurality of perforations 186 therethrough. The wall 184 defines the exterior surface of the separating drum and is preferably cylindrical. The wall 184 also defines the cylindrical interior of the separating drum.

The perforations 186 are preferably circular or obround holes, and are sized so as to permit shelled beans to pass therethrough but to prevent unshelled beans from passing therethrough. For example, the perforations may be 0.343, 0.375, or 0.406 inch diameter holes. Additionally, the perforations may be 0.468 by 0.875 inch oblong holes or 0.531 by 0.750 inch oblong holes. The specific size and configuration of the perforations 186 can vary to suit the type of crop to be harvested. The plurality of perforations through the wall 184 define a screen or sieve 185 that prevents unshelled beans from exiting the interior of the separating drum 62. In this manner, the separating drum 62 operates as a sieve or screen that separates unshelled beans from shelled beans.

The unshelled beans and shelled beans enter the inlet 188 of the separating drum 62 where they are immediately rotated by the separating drum 62. The inlet 188 is a large circular opening into the interior of the drum, preferably larger than the opening 230 from which the beans are conveyed from the conveying conduit 56. The cylindrical wall 184 defines a tubular or drum-shape having opposing open ends, where the opposite open ends define the inlet 188 and outlet 190 of the separating drum 62. The wall 184 can be other shapes beside a cylinder. For example, the separator 62 could be conical or spherical and still function as described herein.

The separating drum 62 rotates about a shaft 82 that extends longitudinally through the center of the cylindrical separating drum 62. Mounted on the shaft 82 are a series of rings 194 spaced along the length of the shaft 82. Attached to the rings 194 are a plurality of bars 192 equidistantly spaced along the cylindrical periphery of the rings 194. The bars 192 extend the entire length of the separating drum 62 and are parallel with the shaft 82. The screen 185 slips over the bars 192 and rings 194 and is mounted to the bars 192 and rings 194. Hence, the rings 194 and the bars 192 support the perforated wall 184. The screen 185 may be welded, riveted, screwed, or attached by other means to the rings 194 and bars 192.

Shelled and unshelled beans that enter the interior of the separating drum 62 are rotated by the drum such that they tumble within the interior of the drum 62. This tumbling action causes the shelled beans to fall through the perforations 186, while the unshelled beans will travel along the length of the drum 62. The unshelled beans travel along the length of the separating drum while it is rotating because the drum is inclined from 5 to 45 degrees with respect to horizontal. That is, the inlet side of the separating drum 62 is elevated with respect to the outlet side of the separating drum. This causes the shelled and unshelled beans to be gradually moved toward the outlet 190 of the separating drum 62 while the separating drum is rotating. The separating drum 62 is preferably rotated between 2 and 25 rpm. By the time the beans have reached the outlet end of the separating drum, nearly all of the shelled beans fall through the perforations 186 and into the interior of the bin 60.

As evident from FIGS. 2, 6, and 14–16, the separating drum 62 is partially located in the interior 206 of the bin 60, which permits the shelled beans to pass through the perforations 186 and fall directly into the interior 206 of the bin 60. This is advantageous because if the rotating drum 62 were located outside of the bin 60, or at least not over the bin, the shelled beans would have to be conveyed from an exterior location to the bin 60, further complicating the construction of the combine 30. Hence, it is preferred that the separating drum 62 be located at least partially above the interior of the bin 60, preferably at least partially in the bin, so that the shelled crops fall directly into the bin 60. However, the combine 30 will still function as contemplated when the separating drum 62 is not in the bin 60 and is not located over the bin, but in this case it is necessary to convey the separated shelled beans to the bin from the external location and convey the unshelled pods from the outlet of the bin back into the interior of the combine 30. This essentially requires another conveying device of two or more augers, or another bucket elevator.

As described earlier, the bin 60 is rotatable such that the beans within the bin may be dumped from the bin. Because the rotating separating drum 62 is attached to the bin 60, it rides up with the bin 60 when it is rotated during the dumping process.

Figure 13:
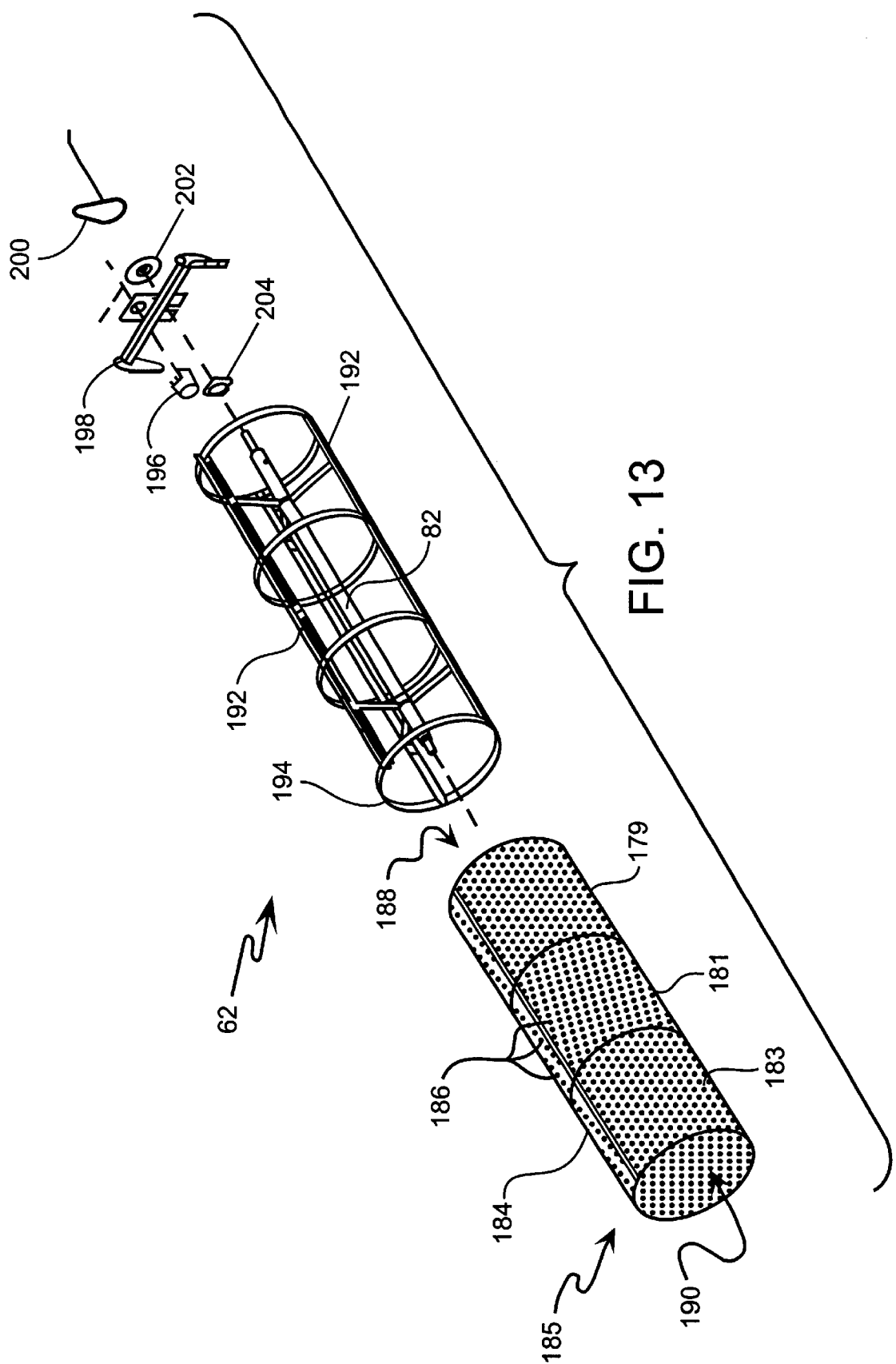
FIG. 13 is an exploded perspective view of one embodiment of a drum separator of the combine.

The screen 185 can include uniform perforations 186 throughout its length, or may have different sized openings at different locations. For example, the inlet end of the screen 185 can include larger perforations than the outlet end of the screen. The screen 185 may be one long cylindrical tube, or, as depicted in FIG. 13, can be fabricated from a plurality of screen sections 179, 181, 183 to define the drum-like shape. The a plurality of screen sections 179, 181, 183 are joined together to define the cylindrical screen 185. Each of the screen sections 179, 181, 183 includes the same size perforations 186. However, the sections 179, 181, 183 can each have perforations 186 that are a different size that those of an adjacent screen section. For example, the first screen section 179 can include larger sized perforations than that of the second screen section 181, and the second screen section 181 may include larger sized perforations than that of the third screen section 183. In this manner, the size of the perforations 186 may gradually decrease from the inlet 188 to the outlet 190.

Figure 25:
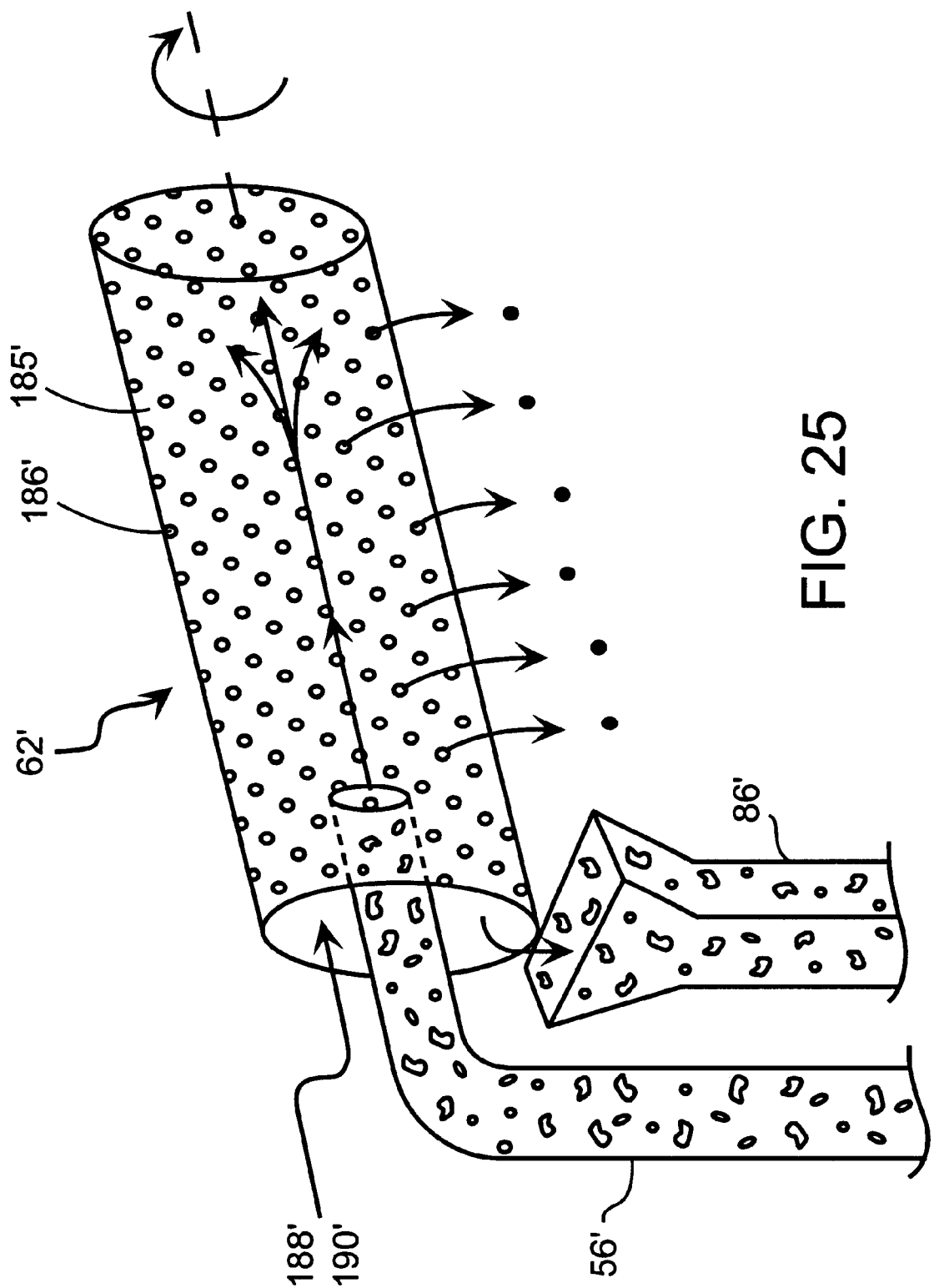
FIG. 25 is a partial perspective view of another separating drum.

The inlet 188 and the outlet 190 need not be located at opposite ends of the separating drum 62. For example, FIG. 25 illustrates an alternative embodiment of a separating drum 62' in a combine, where the inlet opening 188' and the outlet opening 190' are a common opening in the cylindrical screen 185'. As depicted in FIG. 25, the end of the cylindrical screen 185' opposite from the inlet 188' and outlet 190' is covered with a screen. This end may also be completely closed off. The other end of the cylindrical screen 185' is at least partially open and defines the inlet 188' and outlet 190'. The shelled beans and the unshelled beans are blown into the interior of the separating drum 62' with the conveying conduit 56', preferably at or near the screened end of the separating drum 62'. The crop material can also be conveyed by an auger or other similar device to the interior of the screen 185'. In this embodiment, the screened end of the separating drum 62' is elevated with respect to the end having the inlet 188' and outlet 190'. Thus, the unshelled beans in the interior of the screen 185' will tend to move toward the outlet 190' when the separating drum 62' is rotated, while the shelled beans will fall through the perforations 186' into the bin or some other location. The unshelled beans will exit the cylindrical screen 185' at the outlet 190' and fall into the conduit 86', where they may be conveyed back to the thrashing cylinders of the combine.

Referring again to FIG. 13, a hydraulic motor 196 is mounted to a motor mount 198. The motor mount 198 is mounted to the bin 60. The hydraulic motor 196 is powered by the hydraulic pump 37 and rotates a chain 200. The chain 200 drives a reduction gear 202, which is connected to the shaft 82 of the separating drum. The shaft 82 of the separating drum 62 is supported by the motor mount 198 and is mounted in a bearing 204. The hydraulic motor 196 causes the drum 62 to rotate about the axis of the shaft 82. Although the shaft 82 is located on the longitudinal center axis of the cylindrical screen 185, the shaft 82 could also be located off-center such that the separating drum rotates about an axis that is spaced from the longitudinal center axis of cylindrical screen. Additionally, the shaft 82 can be angled with respect to the longitudinal center axis of the cylindrical screen 185.

The unshelled pods that do not pass through the perforations 186 traverse the length of the inclined drum 62 and exit the drum at the outlet 190. The unshelled pods fall out of the outlet 190 due to gravity, and enter the exit conduit 86, which is essentially a Y-shaped opening located immediately beneath the outlet 190 of the separating drum 62. The exit conduit 86 conveys the unshelled beans downward to an auger 215 located in a cylindrical conduit 216. The auger 215 is mounted to a shaft 214, which is driven by a hydraulic motor 74 mounted to a bracket 212. The bracket 212 is mounted to the housing 208 of the bin 60.

Figure 14:
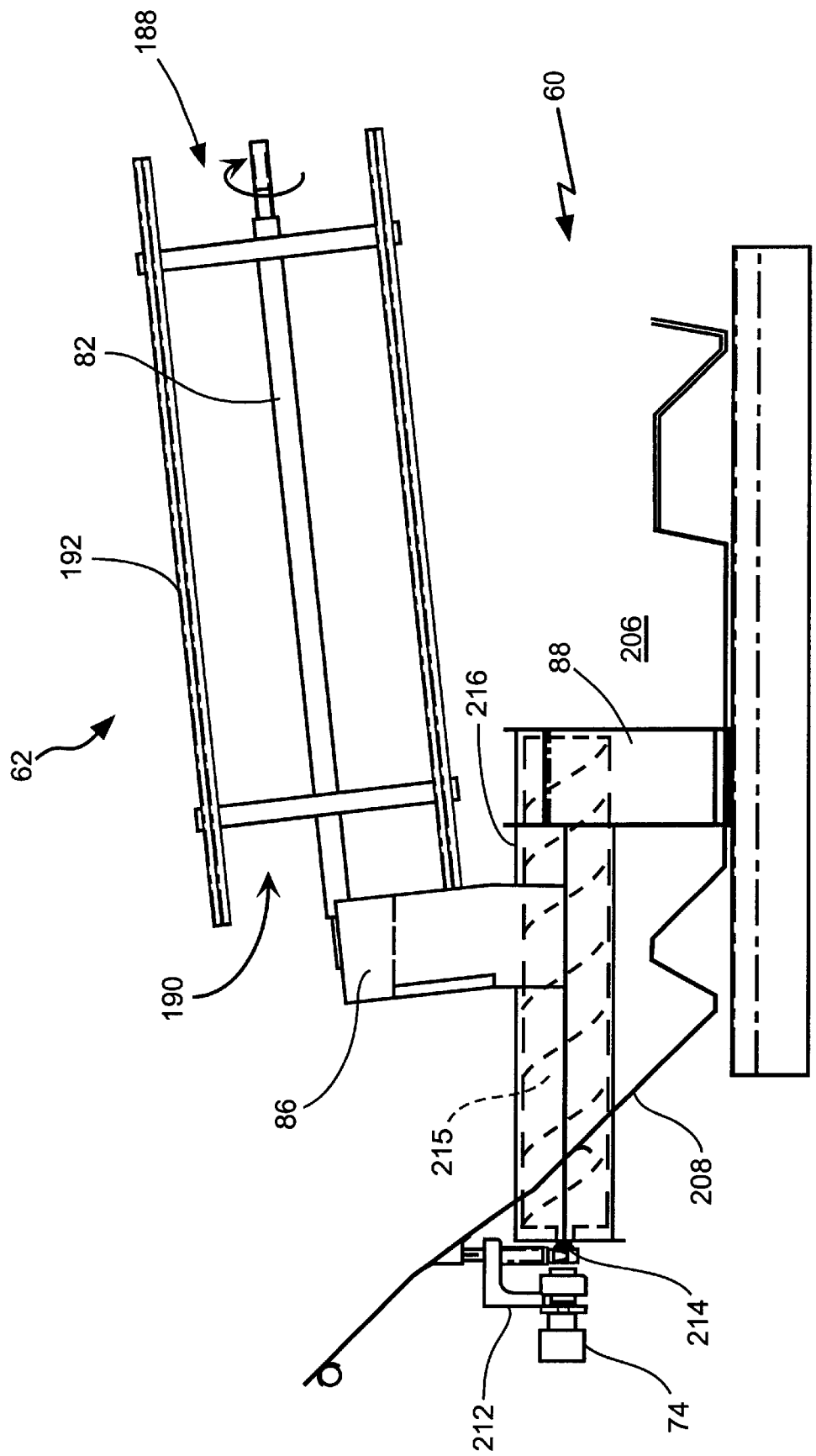
FIG. 14 is a partial side view of the drum separator, where the drum separator is located in a storage bin of the combine.
Figure 15:
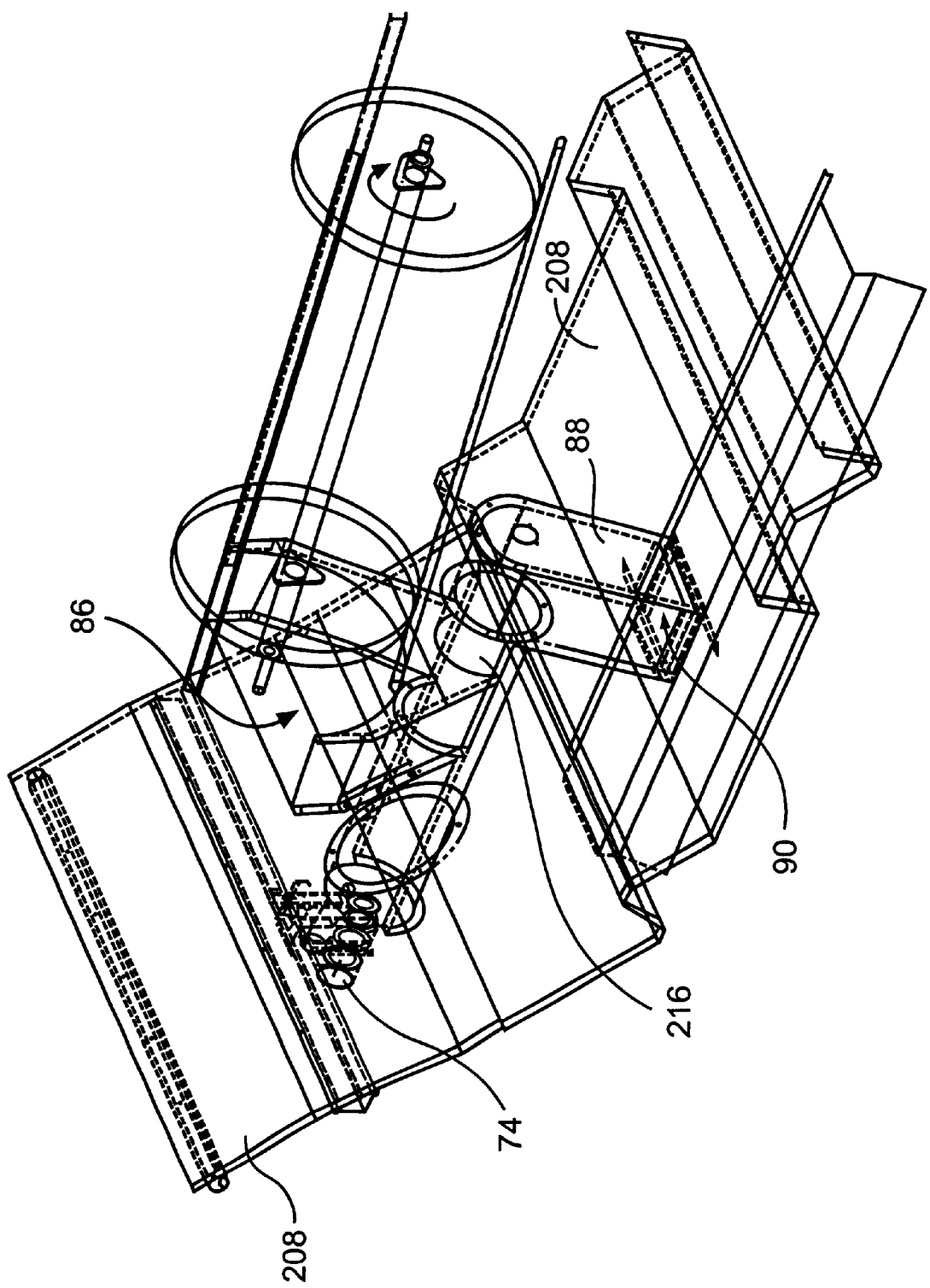
FIG. 15 is a partial perspective view of the drum separator, where the drum separator is located in the storage bin of the combine.
Figure 16:
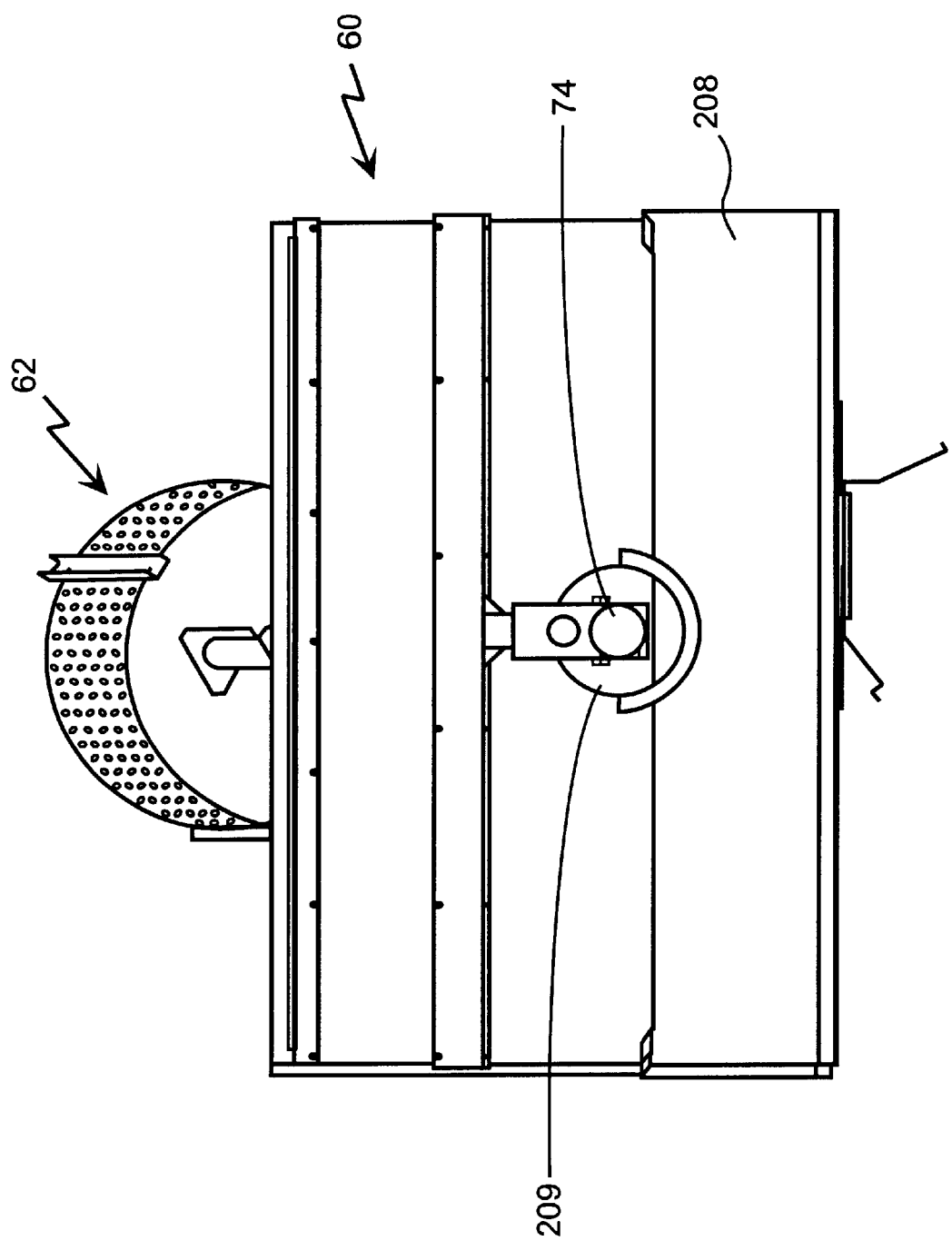
FIG. 16 is a partial end view of the drum separator located in the bin of the combine.

As is apparent from FIGS. 14–16, the auger 215 and the cylindrical conduit 216 are located within the interior 206 of the bin 60. The auger 215 in the cylindrical conduit 216 passes the unshelled beans that have fallen into the exit conduit 86 to a feed conduit 88. As shown in FIG. 6, the feed conduit 88 delivers the unshelled beans back to the fifth thrashing cylinder 46 via a recirculation opening 90. Hence, the exit conduit 86, the cylindrical conduit 216, and the feed conduit 88 together function as a recirculation channel or tailings return passageway that communicates the outlet 190 of the separating drum 62 with at least one of the thrashing cylinders of the combine. In the preferred embodiment, the recirculation opening 90 opens into the concave plate located immediately above the fifth thrashing cylinder 46. However, the recirculation opening could also feed into any of the other thrashing cylinders 38, 40, 42, 44.

The end of the cylindrical conduit 216 opposite the feed conduit 88 is open so as to define a purge opening or outlet 209. The hydraulic motor 74 may be run in reverse such that the auger 215 no longer feeds or conveys material toward the feed conduit 88, but instead feeds or conveys material toward the purge opening 209. The purge opening 209 is essentially an opening from the interior of the cylindrical conduit 216. Hence, the cylindrical conduit 216 functions as a purge channel or passageway from the tailings return conduit between the separating drum 62 and the thrashing cylinders. The operator of the combine 30 may reverse the motor 74 from the cab 34 with a switch in the cab. By reversing the motor 74, the auger 215 will rotate in reverse and cause material in the conduit 216 to feed out of the purge opening 209. The purge opening 209 opens directly to the exterior surroundings of the combine 30. When the auger 215 is rotating in a forward direction such that tailings are fed to the thrashing cylinders, the tailings return loop is completed. When the auger 215 is rotating in a reverse direction, the tailings are fed to the exterior environment through the opening 209. This feature of the combine 30 permits an operator of the combine 30 to periodically "purge" the tailings return loop. Because the separating drum 62 essentially separates particles that are larger than a shelled bean from particles that are equal to or smaller than an shelled bean, other items besides unshelled beans, such as large stones and rocks, tend to circulate through the above-described tailings return system. This is particularly common when the crops have been windrowed. During harvesting with the combine 30, an operator may remove these undesired items from the tailings return loop by rotating the auger 215 in reverse. This causes the rocks and other items that are larger than the shelled beans to be discharged out of the combine 30 from the outlet 209. Thus, the tailing return system includes a purge channel through which rocks and other items that have been caught in the tailings return loop may be purged from the combine. The purge opening 209 is also useful when the combine approaches a section of immature or green pods in a field. These immature pods tend not to shell and thus get caught in the tailings return loop of the combine 30. An operator of the combine 30 may reverse the auger 215 while the combine is harvesting these sections of a field, or may reverse the auger after these immature pods have been harvested and are caught in the tailings return loop.

When the auger 215 conveys material toward the feed conduit 88, unshelled beans are delivered from the outlet 190 of the separating drum 62 to the fifth thrashing cylinder 46 where they are recirculated back through at least some of the thrashing cylinders and are shelled by the thrashing action. Eventually, these recirculated unshelled pods are shelled by the trashing cylinders and are redelivered to the separating drum 62 where they fall through the perforations 186 and into the bin 60 for storage.

With the combine 30, the objective is to shell all of the beans. If the fourth and fifth thrashing cylinders 44, 46 are rotated too fast for the specific harvesting conditions, the beans will be damaged. Hence, to minimize damage the beans, the thrashing cylinders 44, 46 are preferably run at a sufficiently low speed so as to not damage the beans. However, at this speed, a percentage of the beans are necessarily not shelled such that a number of unshelled beans pass through the system. Nevertheless, the combine 30 has the ability to recirculated these unshelled beans or "tailings" back through the combine separating assemblies. This is because the separating drum 62 screens out the unshelled beans from the shelled beans. The unshelled beans travel to the end of the separating drum 62 and exit the outlet 190. The unshelled beans are then delivered back to the thrashing cylinders. The unshelled beans will repeatedly follow this tailings return loop until they are eventually shelled and delivered to the storage bin 60.

Conventionally, most tailings return systems in conventional combines operate under the assumption that at least 85% of the crops will be properly separated and that 15% is the maximum amount of tailings that will need to be captured and run back through the system. The combine 30 handles the desirable portions of the crop, such as beans, so gently that at times 40% of the pods must be delivered back through the tailings return loop. The combine 30 has the capacity to handle this capacity of tailings, where standard combines do not. This incapacity of conventional combines forced previous combines to increase their thrashing cylinder speeds in an attempt to shell more pods, which tended to damage the beans on the first pass.

The combine having the above-described tailings return system, in combination with the above-described thrashing cylinders, produces far less damage than conventional combines that are used on beans, approximately 1/10 the damage of conventional combines. Thus, in the combine 30, the multiple thrashing cylinders are run slower than conventional combines. Running the thrashing cylinders at these slower speeds tends to prevent damage to the beans. Even though the beans are hit often by the multiple thrashing cylinders, because the speed of the last two thrashing cylinders can be adjusted, damage to the beans can be minimized. However, this can increase the amount of unshelled pods that pass through the thrashing cylinders. By including the rotating separating drum 62 in the combine 30, the unshelled beans can be captured and returned back to the thrashing portion of the combine where they are be shelled. Additionally, by locating the separating drum 62 above the bin 60, the amount of handling of the beans is reduced.

It will now be appreciated that one embodiment of the present invention provides a combine that is particularly suited to separate crops, especially those of the Leguminosae family, such as beans. The combine is more efficient than conventional combines in preventing damage to the seed of pods. Further, the present invention provides a combine having a tailing return system that can handle a large quantity of unshelled pods so that the original crops entering the system can be handled more gently than previous combines. These advantages are attributable to the above-described different aspects of the present invention. The foremost being the variable speed drive of at least some of the thrashing cylinders, the proper number of fingers per thrashing cylinder, the inclusion of a drum separator downstream of the thrashing cylinders with respect to the flow direction of crop in the combine, and the specific configuration of the disk separators. Accordingly, it is apparent that the combine offers many advantages over conventional combines. As will be appreciated by those skilled in the art, the various features of the combine 30 are amenable to many different applications in which it is desirable to separate portions of crops, such as the seed of pods.

The principles, preferred embodiments, and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalence employed, without departing from the spirit of the present invention. Accordingly, it is expressly intended that all such variations, changes and equivalents which fall within the spirit and scope of the present invention as defined in the claims be embraced thereby.

What is claimed is:

1. A combine for separating crops, comprising:
   a separator having an outer wall defining an interior space, said outer wall having a plurality of perforations therethrough, said separator having an inlet to said interior space and having an outlet from said interior space, said separator being rotatable, said perforations of said separator for separating shelled crops from unshelled crops;
   a device for rotating said separator;
   at least one thrashing cylinder having a plurality of fingers for thrashing the crops;
   a conveyor for conveying crops to said inlet of said separator from a location downstream of said thrashing cylinder with respect to a direction of crop travel in said combine; and
   a channel communicating said outlet of said separator with said at least one thrashing cylinder, said channel for conveying unshelled crops from said interior of said separator to said thrashing cylinder.

2. The combine of claim 1, wherein said separator is at least partially located above a bin of the combine such that shelled crops can fall through said perforations of said separator into said bin.

3. The combine of claim 1, wherein said outer wall is cylindrical and said perforations include a plurality of circular holes.

4. The combine of claim 2, wherein said bin and said separator are movable from a first position to a second position, said second position for dumping the shelled crops from said bin.

5. The combine of claim 1, wherein said conveyor includes a bucket conveyor.

6. The combine of claim 1, wherein said inlet of said separator is elevated with respect to said outlet of said separator.

7. The combine of claim 1, wherein said at least one thrashing cylinder is one of a plurality of thrashing cylinders for thrashing crops.

8. The combine of claim 1, wherein said perforations are sized to separate shelled beans from unshelled beans.

9. The combine of claim 1, wherein said outer wall defines a cylindrical shape, said inlet being located at a first open end of said cylindrical shape, said outlet being located at a second open end of said cylindrical shape.

10. The combine of claim 1, further comprising a purge passageway that communicates said channel with an exterior of said combine, said purge passageway for purging said combine of unwanted debris.

11. The combine of claim 1, wherein the at least one thrashing cylinder further comprises:
   a first thrashing cylinder having a plurality of radially outwardly extending fingers for thrashing crops, said first thrashing cylinder being mounted for rotation;
   a second thrashing cylinder having a plurality of radially outwardly extending fingers for thrashing crops, said second thrashing cylinder being mounted for rotation, and
   a variable speed drive for varying a rotation speed of said second thrashing cylinder relative to a rotation speed of said first thrashing cylinder while said first thrashing cylinder is rotating.

12. The combine of claim 11, wherein said variable speed drive includes a belt mounted on an asymmetric sheave, said asymmetric sheave being expandable such that a diameter of rotation of said belt changes when said asymmetric sheave is expanded.

13. The combine of claim 12, further comprising an actuator for causing said sheave to move from a first position to a second position, said sheave expanding when said sheave is moved from said first position to said second position.

14. The combine of claim 13, wherein said actuator includes a reversible motor.

15. The combine of claim 11, wherein said first thrashing cylinder is adjacent to said second thrashing cylinder such that said fingers of said first thrashing cylinder interdigitate with said fingers of said second thrashing cylinder when said first and second thrashing cylinders are rotating.

16. The combine of claim 11, further comprising a chain drive for rotating said first cylinder, said variable speed drive including a belt drive for rotating said second cylinder.

17. The combine of claim 11, wherein said first thrashing cylinder, said second thrashing cylinder, and said variable speed drive are part of a bean combine for separating beans from bean plants.

18. A combine for separating crops, comprising:
   a drum-shaped separator having an interior and a cylindrical exterior surface, said exterior surface having a plurality of perforations therethrough, said separator mounted for rotation, said perforations for separating shelled crops from unshelled crops;
   a bin having an interior for holding crops that have been shelled by said separator, said separator being located above said interior of said bin such that shelled crops can fall through said perforations into said bin; and
   a plurality of adjacent disk separators, said disk separators each including a rotatable shaft and a plurality of disks, said disks of each of said disk separators being spaced apart from each other along a length of said rotatable shaft, the disks of adjacent disk separators defining a plurality of spaces through which only portions of the crops may pass, said drum separator being located downstream of said disk separators with respect to a direction of crop travel in the combine.

19. The combine of claim 18, wherein said combine is self-propelled and includes a motor and ground-contacting driven wheels.

20. The combine of claim 18, wherein said perforations are sized to separate shelled beans from unshelled beans.

21. The combine of claim 18, further comprising a device for rotating said separator about a longitudinal axis of said separator.

22. The combine of claim 18, wherein said separator is part of a tailings return system in said combine.

23. The combine of claim 18, further comprising a conveyor for conveying shelled and unshelled crops from a location downstream of said disk separators to said drum-shaped separator.

* * * * *